United States Patent
Barclay et al.

(10) Patent No.: US 8,777,753 B2
(45) Date of Patent: Jul. 15, 2014

(54) CONTROLLING INTERACTIVITY FOR GAMING AND SOCIAL-COMMUNICATION APPLICATIONS

(75) Inventors: Brian J. Barclay, Atlanta, GA (US); Andrew C. Guinn, Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 0 days.

(21) Appl. No.: 13/498,956

(22) PCT Filed: Sep. 29, 2010

(86) PCT No.: PCT/US2010/050793
§ 371 (c)(1),
(2), (4) Date: Mar. 29, 2012

(87) PCT Pub. No.: WO2011/041467
PCT Pub. Date: Apr. 7, 2011

(65) Prior Publication Data
US 2012/0184362 A1    Jul. 19, 2012

Related U.S. Application Data

(60) Provisional application No. 61/247,359, filed on Sep. 30, 2009.

(51) Int. Cl.
*A63F 13/30* (2014.01)
*A63F 13/45* (2014.01)

(52) U.S. Cl.
USPC .............................................. 463/42; 463/25

(58) Field of Classification Search
None
See application file for complete search history.

(56) References Cited

U.S. PATENT DOCUMENTS 8,360,862 B2 *  1/2013  Allen et al. ..................... 463/25

| 2008/0141153 | A1 * | 6/2008 | Samson et al. | 715/769 |
| 2008/0163379 | A1 | 7/2008 | Robinson et al. | |
| 2010/0062840 | A1 * | 3/2010 | Herrmann | 463/25 |
| 2010/0203963 | A1 * | 8/2010 | Allen et al. | 463/30 |
| 2010/0216553 | A1 * | 8/2010 | Chudley et al. | 463/42 |

FOREIGN PATENT DOCUMENTS

| WO | WO-2009026308 | 2/2009 |
| WO | WO-2009042563 | 4/2009 |
| WO | WO-2009097538 | 8/2009 |
| WO | WO-2011041467 | 4/2011 |

OTHER PUBLICATIONS

"PCT Application No. PCT/US10/50793 International Preliminary Report on Patentability", Jan. 18, 2012, 9 pages.
"PCT Application No. PCT/US10/50793 International Search Report", Jun. 27, 2011, 10 pages.

* cited by examiner

*Primary Examiner* — Bach Hoang
(74) *Attorney, Agent, or Firm* — DeLizio Gilliam, PLLC

(57) ABSTRACT

A wagering game system and its operations are described herein. In embodiments, the operations can include determining a selection of a selectable object in a first area of a gaming display that is under control of a first application module associated with a wagering game session. The first application module can be for a social communication application or can provide social communication functionality. The operations can further include determining a selection purpose for the selection, determining transference instructions for an item representation of the selectable object, and transferring the item representation to a second area of the gaming display that is under control of a second application module. The second application module can be for a wagering game application or can provide wagering game functionality. The operations can further include performing a function associated with the second application module according to the selection purpose.

19 Claims, 11 Drawing Sheets

CONTROLLING INTERACTIVITY FOR GAMING AND SOCIAL-COMMUNICATION APPLICATIONS

RELATED APPLICATIONS

This application claims the priority benefit of U.S. Provisional Application Ser. No. 61/247,359 filed Sep. 30, 2009.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

TECHNICAL FIELD

Embodiments of the inventive subject matter relate generally to wagering game systems and networks that, more particularly, control interactivity for gaming and social-communication applications.

BACKGROUND

Wagering game machines, such as slot machines, video poker machines and the like, have been a cornerstone of the gaming industry for several years. Traditionally, wagering game machines have been confined to physical buildings, like casinos (e.g., resort casinos, road-side casinos, etc.). The casinos are located in specific geographic locations that are authorized to present wagering games to casino patrons. However, with the proliferation of interest and use of the Internet, shrewd wagering game manufacturers have recognized that a global public network, such as the Internet, can reach to various locations of the world that have been authorized to present wagering games. Any individual with a personal computing device (e.g., a personal computer, a laptop, a personal digital assistant, a cell phone, etc.) can connect to the Internet and play wagering games. Consequently, some wagering game manufacturers have created wagering games that can be processed by personal computing devices and offered via online casino websites ("online casinos"). However, online casinos face challenges and struggles. For instance, online casinos have struggled to provide the excitement and entertainment that a real-world casino environment provides. Some online casinos have struggled enforcing cross jurisdictional restrictions and requirements. Further, some online casinos have struggled adapting the online gaming industry to a traditionally non-wagering game business environment. As a result, wagering game manufacturers, casino operators, and online game providers are constantly in need of innovative concepts that can make the online gaming industry appealing and profitable.

SUMMARY

In some embodiments, one or more machine-readable media having instructions stored thereon, which when executed by a set of one or more processors causes the set of one or more processors to perform operations comprising determining a selection of a selectable object in a first area of a gaming display that is under control of a first application module associated with a wagering game session wherein the first application module is configured to provide social communication functionality; determining a selection purpose for the selection; determining transference instructions for an item representation of the selectable object; transferring the item representation to a second area of the gaming display that is under control of a second application module, wherein the second application module is configured to provide wagering game functionality; and performing a wagering game function associated with the second application module according to the selection purpose.

In some embodiments, the first application module and the second application module belong to different, independent gaming applications simultaneously running during the wagering game session.

In some embodiments, said operation for determining the selection purpose for the selection includes operations further comprises presenting a selection-purpose menu with a plurality of selection-purpose options for the selectable object; and determining a player input that selects one selection-purpose option related to the selection purpose, wherein the one selection-purpose option is one of the plurality of selection-purpose options.

In some embodiments, said operation for determining the selection purpose for the selection includes operations further comprising: determining a player input-selection activity; and referring to a selection-activity setting that describes a selection-purpose description for the selection activity.

In some embodiments, said operation for determining transference instructions for the item representation of the selectable object includes operations further comprising determining player input that instructs movement of the item representation; and presenting movement of the item representation in the gaming display during the transferring of the item representation.

In some embodiments, the operations further comprise determining a graphical description that represents the selection purpose; generating a graphical image object that represents the graphical description; and assigning the graphical image object to the item representation.

In some embodiments, the operations further comprise assigning persistent metadata to the item representation that indicates the selection purpose, wherein the persistent metadata persists with the object beyond the wagering game session.

In some embodiments, a computer-implemented method, comprises determining a selection of a wagering game content item that is configured to be selectable within, and transferrable from, a gaming interface associated with a wagering game session, wherein the wagering game content item is presented as part of a wagering game application; presenting a transferrable item representation of the wagering game content item; determining a player-indicated movement of the transferrable item representation to a social communication application; transferring the transferrable item representation from the gaming interface to the social communication application in accordance with the player-indicated movement; determining a player-indicated release action of the transferrable item representation in an area of the social communication application; performing a social communication function associated with the area; and using the transferrable item representation in the social communication function.

In some embodiments, determining the selection of the wagering game content item comprises determining activation of one or more player input selection mechanisms.

In some embodiments, the performing the social communication function comprises generating a chat message, and wherein using the transferrable item representation in the social communication function comprises embedding the transferrable item representation in the text message and sending the chat message via the social communication application.

In some embodiments, the computer-implemented method further comprises determining a player-indicated selection purpose for the wagering game content item; assigning the player-indicated selection purpose to the transferrable item representation as metadata that persists with the transferrable item representation; and determining the social communication function based at least in part on the player-indicated selection purpose assigned to the transferrable item representation.

In some embodiments, the social communication application is one or more of a chat application, an instant messaging application, a social networking application, an email application, a text messaging application, and a blogging application.

In some embodiments, the computer-implemented method further comprises determining that a player account associated with the wagering game session performs a required activity; and enabling the wagering game content item to be selectable and transferrable based on the performance of the required activity.

In some embodiments, the computer-implemented method further comprises determining that the transferrable item representation is released on an inventory for storing the transferrable item representation; and storing the transferrable item representation in the inventory.

In some embodiments, a system comprises a wagering game server comprises a server content controller configured to provide selectable wagering game content, and a social communication controller configured to control social communication applications during a wagering game session; and a client device comprising a client content controller configured to present the selectable wagering game content in a gaming display, and a gaming social communication module configured to determine a selection of the selectable wagering game content, determine movement of the selectable wagering game content between a wagering game application and a social communication application, determine a purpose for the selection, and perform a function associated with the purpose for the selection.

In some embodiments, the wagering game server further comprises an object transfer module configured to generate representations of the selectable wagering game content, and package metadata into the representations regarding the purpose for the selection.

In some embodiments, the gaming social communication module is further configured to determine the selection purpose using analytics about one or more of a player account, player game play history, a player selection history, properties of the selected item, events of the wagering game session, and environmental events.

In some embodiments, the gaming social communication module is further configured to determine a selection of a file stored on the client device, generate an item representation that represents the file, transfer the item representation to the social communication application running on the client device, launch a web browser application on the client device, present a gaming interface in the web browser, present the social communication application in the web browser, determine selection of the item representation from the social communication application, determine a drag-and-drop action of the item representation to the gaming interface presented in the web browser, and incorporate the file into the gaming interface.

In some embodiments, an apparatus comprises a content controller configured to present wagering game content, via a wagering game application, during a wagering game session, and present chat content, via a chat application, simultaneously with the wagering game content. The apparatus further comprises a gaming social communication module configured to determine selection of a chat contact identifier included in the chat content, wherein the chat contact identifier represents a social contact account associated with a wagering game player account for the wagering game session, present a graphical representation of the chat contact identifier, determine a player-indicated movement of the graphical representation to a wagering game content item included in the wagering game content, transfer the graphical representation of the chat contact identifier to the wagering game content item according to the player-indicated movement, and perform a wagering game function associated with the wagering game content item.

In some embodiments, the wagering game function is a pre-assigned function that incorporates the graphical representation of the chat contact identifier into the wagering game content item.

In some embodiments, the wagering game function is a pre-assigned function that transfers a benefit from the wagering game content to an additional wagering game player account associated with the chat contact identifier.

In some embodiments, an apparatus comprises: means for presenting a selectable wagering-game object to a wagering game player account via a wagering game interface; means for determining a player-initiated selection of the selectable wagering-game object in the wagering game interface; means for determining a player-initiated transfer of the selectable wagering-game object to an inventory in a social communication application; means for storing the selectable wagering-game object as a persisted object within the inventory; means for detecting a player-initiated use of the persisted object; and means for performing a wagering game function based on the player-initiated use of the persisted object.

In some embodiments, the apparatus comprises means for presenting a wagering game message in a message section of the social communication application, wherein the wagering game message is responsive to the persisted object; means for determining the player-initiated selection and transfer of the persisted object in the inventory to the message section of the social communication application; and means for performing a wagering game function in response to the wagering game message using the persisted object.

In some embodiments, the means for detecting a player-initiated use of the persisted object comprises means for determining an additional player-initiated transfer of the persisted object to the wagering game interface, and means for presenting a wagering game activity in response to the additional player-initiated transfer of the persisted object to the wagering game interface.

In some embodiments, the apparatus further comprises means for determining an additional player-initiated transfer of the persisted object to a social contact identifier of the social communication application; and means for sending an instance of the persisted object to an additional wagering game player account associated with the social contact identifier.

BRIEF DESCRIPTION OF THE DRAWING(S)

Embodiments are illustrated in the Figures of the accompanying drawings in which.

DESCRIPTION OF ILLUSTRATIVE EMBODIMENTS

Figure 1:
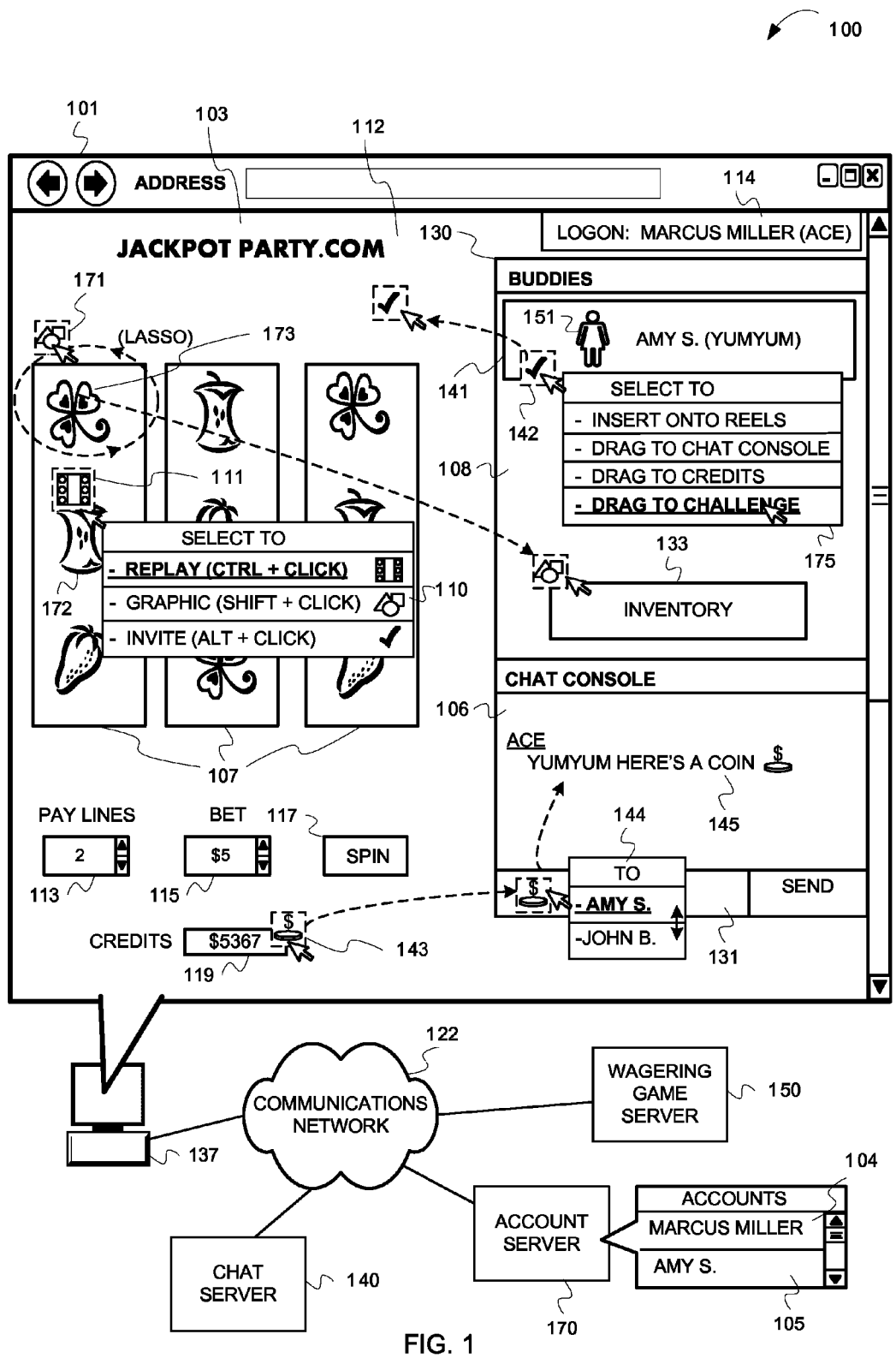
FIG. 1 is an illustration of selecting and transferring selectable content between a wagering game interface and a social-communication application, according to some embodiments.

This description of the embodiments is divided into five sections. The first section provides an introduction to embodiments. The second section describes example operating environments while the third section describes example operations performed by some embodiments. The fourth section describes additional example operating environments and the sixth section presents some general comments.

Introduction

This section provides an introduction to some embodiments.

Social communication is on the rise. Internet users are enjoying a proliferation of social networking mechanisms (e.g., social networking websites, online chats, blogging, social networking applications, etc.) that are appearing online in vast quantities. Many of those Internet users are also wagering game enthusiasts. Many wagering game enthusiasts are demanding greater access to wagering games and content related to wagering games. As stated previously, some wagering game companies have created online wagering game websites that provide a way for wagering game enthusiasts to play wagering games while connected to the Internet (e.g., via a web-browser). Some online wagering game websites provide various features, such as social networks and social networking functionality. Social networks allow wagering game players ("players") to create social network user accounts with one or more unique identifiers that represent an online persona. One example of a unique identifier is an "avatar." Avatars are graphical, cartoon-like depictions of a social network persona. These online personas and associated avatars add to the fun of belonging to a social network. Many online casinos, however, present an unsatisfactory wagering game experience to players who enjoy social networking.

Some embodiments of the inventive subject matter describe examples of controlling interactivity for gaming and social-communication applications in a network wagering venue (e.g., an online casino, a wagering game website, a wagering network, etc.). In some embodiments, social-communication applications include various forms of electronic message applications, such as chat, instant messaging, texting, email, blogging, and so forth. Embodiments can be presented over any type of communications network (e.g., public or private) that provides access to wagering games, such as a website (e.g., via wide-area-networks, or WANs), a private gaming network (e.g., local-area-networks, or LANs), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

In some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

FIG. 1 is a conceptual diagram that illustrates an example of selecting and transferring selectable content between a wagering game interface and a social-communication application, according to some embodiments. In FIG. 1, a wagering game system ("system") 100 includes a computer 137 connected to a wagering game server 150 via a communications network 122. Also included in the system 100 are an account server 170 and a chat server 140, which are also connected to the communications network 122. The account server 170 host can host a wagering game account (e.g., player account 104 for the user "Marcus Miller"). A user (e.g., Marcus Miller) can log in to the player account 104 via a web browser 101 presented by the computer 137. The web browser 101 can also present an online wagering website ("website") 103 (e.g., "Jackpot Party.com") hosted by the wagering game server 150. The website 103 can present login credentials 114 for the player account 104. The wagering game server 150 can provide gaming content (e.g., a slot game that includes reels 107, a pay line meter 113, a bet meter 115, a credit meter 119, and a spin button 117). The web browser 101 can present the gaming content for the website 103, which the player account can utilize during a wagering game session (i.e., while logged in to the player account 104 on the website 103).

The wagering game server 150 can also host a social network. The wagering game server 150 can include other devices, servers, mechanisms, etc., that provide functionality (e.g., controls, web pages, applications, etc.) that web users can use to connect to the website 103 and utilize social networking and website features (e.g., communications mechanisms, applications, etc.). The wagering game server 150 can provide social communication content, including a chat application 130. The chat application 130 can includes a social contacts console 108 (e.g. a buddy list) and a chat messaging console 106. The wagering game server 150 can integrate with the chat server 140, also connected to the communications network 122. The chat server 140 can transmit social communications (e.g., chat messages) between the player account 104 and other accounts, such as an additional player account 105 (e.g., for Amy S.). The additional player account 105 can include social network elements including an avatar 151. The avatar 151 can be included on a social-contact chat object 141 within the chat application 130.

In some embodiments, the system 100 can integrate functionality from the website 103 and the chat application 130 using selectable and transferrable objects ("selectable objects"). For example, the social-contact chat object 141 is selectable by the player account 104. In other words, the player account 104 can select the social-contact chat object 141 (or some element of the social-contact chat object 141, such as the avatar 151). When the player account 104 selects the social-contact chat object 141, a dropdown menu 175 presents several selection options that indicate a purpose for selecting the social-contact chat object 141. The player account 104 can select an option from the dropdown menu 175, such as an option to invite the additional player account 105 (i.e., Amy S.) to participate in a group activity, like a group game (e.g., to challenge Amy S. to compete in a tournament for the slot game) or perform other wagering activity (e.g., to challenge Amy S. to a side-bet). Other options can include incorporating the additional player account 105 into reel elements for the reels 107, initiating a chat session with the additional player account 105, sharing objects and content (e.g., games, coins, etc.) with the additional player account 105, etc. When the player account 104 selects an option from the dropdown menu 175, the system 100 can generate an item representation 142. The item representation 142 can have an appearance that conveys the purpose of the selection (e.g., a checkmark graphic indicates a form of challenge or invitation, as intended by the player account 104). The system 100 can determine a request by the player account 104 to move (i.e., drag-and-drop) the item representation 142 into a section of the website 103. Depending on where the player account 104 drags and drops the item representation 142, the system 100 can provide a different response in accordance with the player's purpose for selecting the social-contact chat object 141. For example, if the player account 104 selects the option to challenge the additional player account 105, and then the player account 104 drags the item representation 142 over the reels 107, the system 100 can assume that the player account 104 is inviting, or challenging, the additional player account 105 to play a slot game challenge, or some other challenge related to the slot game content. On the other hand, if the player account 104 drags the item representation 142 over the credit meter 119, the system 100 can assume that the player account 104 is challenging the additional player account 105 to a side bet. If the system 100 is uncertain of a type of challenge, the system 100 can present options to select a refinement option from an additional dropdown menu.

In other embodiments, the system 100 can present selectable objects that can be selected and moved from other areas of the web browser 101, such as from a wagering game interface 112. For example, the reels 107, or specific portions of the reels (e.g., reel elements) can have selectable portions. For example, the player account 104 can select a reel element 172. The system 100 can present a selection menu 110 that presents different selection options that indicate different selection purposes for selecting the reel element 172. Some options can be related to the reel element 172 as an audio or visual object (e.g., an option to select the reel element 172 as a savable graphic). Other options can be related to a function, activity, or related aspect of the reel element 172 (e.g., a replay of the last spin for the slot game). The system 100 can create an item representation 111 that represents the selected option (e.g., the item representation 111 is a graphic of a video clip which represents a video replay of the slot game as selected from the selection menu 110). In other words, the item representation 111 is a transferrable object that represents the selected object according to the selection purpose for the selected object. The player account can drag and drop the item representation 111 to the chat application 130 (e.g., drag and drop the item representation 111 onto the social-contact chat object 141 to share the video replay with the additional player account 105, drag and drop the item representation 111 onto an inventory 133 to save the video replay, drag and drop the item representation 111 onto the chat messaging console 106 to insert into a chat message, etc.).

The system 100 can detect different types of selection options for the selectable objects and/or for selectable menus. For example, the selection menu 110 can respond to hot keys or keyboard input (e.g., a Ctrl+Click selects a replay selection option, a Shift+Click selects a graphic selection option, an Alt+Click selects an invitation option, etc.). In another example, the system 100 can respond to specific movements of a mouse cursor. For example, the system 100 can detect a lasso (i.e., circling) motion around a reel element 173. The lasso motion can have a pre-specified selection function assigned to it (e.g., a system default selection function, a player assigned selection function, etc.). For example, the lasso activity can indicate that the player account 104 desires to select the reel element 173 as a graphic. The system 100 can then generate an item representation 171 that relates to the pre-specified selection function (e.g., the item representation 171 has a graphical appearance that represents that the reel element 173 is selected as an image object). In another example, some items on the website 103 may only have a single selection function or purpose assigned to them when selected. For example, the credit meter 119, when selected, may only include the option to generate sharable coins. Thus, when the player account 104 selects the credit meter with any selection activity (e.g., a double-click, a lasso movement, a hotkey, etc.), the system 100 can generate an item representation 143 of a coin. The player account 104 can then drag the item representation 143 to the chat messaging application 130 and drop it on an area (e.g., to a section, onto an item, etc.) within the chat messaging application 130. Different application modules that perform separate functions (e.g., a first application module can control functions of the social contacts console 108 and a second application module can control functions of the chat messaging console 106) can control the areas of the chat messaging application 130. For example, the player account 104 can drop the item representation 143 on a message input section 131. The system 100 can determine the function of the message input section 131, which is to input and send chat messages. The system 100, therefore, can determine that the player account 104 wants to send the coin associated with the item representation 143 to another player account. Therefore, the system 100 presents a contact selection menu 144 which the player can use to select a social contact (e.g., via an arrow key movement+Enter, via a mouse click, etc.). The system 100 can then generate a message 145 within the chat message console 106. For example, if the player account 104 selects the user Amy S. to receive the coin, the system 100 generates the message 145 to Amy S.'s player account (i.e., the additional player account 105). The system 100 can then send the message 145 to the additional player account 105. The additional player account 105 can receive the message 145, which can contain the item representation 143. The additional player account 105 can then manipulate the item representation 143 (e.g., drag and drop the coin onto their own instance of a credit meter).

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
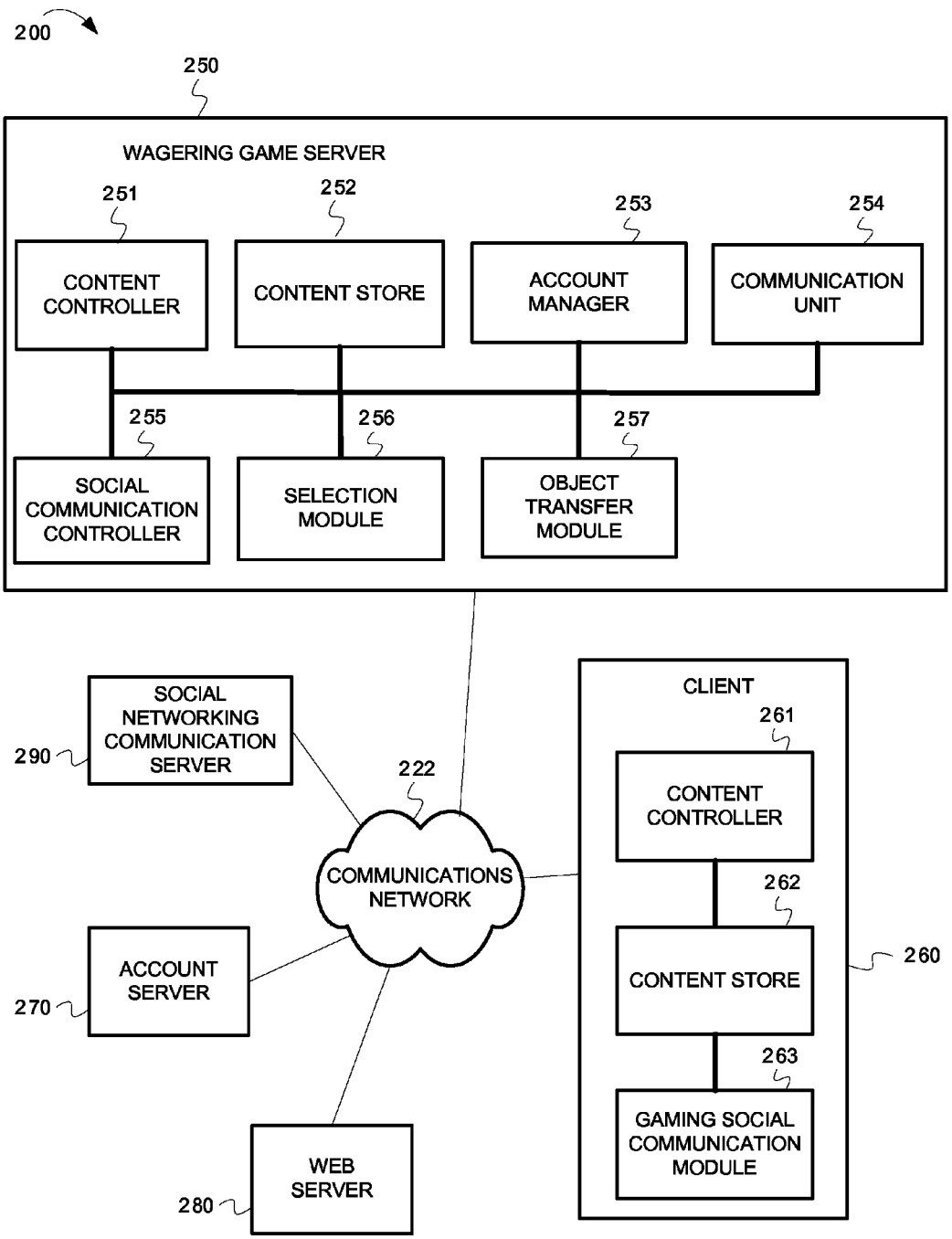
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networking networks. The account server 270 can store wagering game player account information, such as account settings (e.g., settings related to group games, settings related to social contacts, etc.), preferences (e.g., player preferences regarding selection and transfer of gaming content in a social communication console, player preferences regarding award types, preferences related to virtual assets, etc.), player profile data (e.g., name, avatar, screen name, etc.), and other information for a player's account (e.g., financial information, account identification numbers, virtual assets, social contact information, etc.). The account server 270 can contain lists of social contacts referenced by a player account. The account server 270 can also provide auditing capabilities according to regulatory rules. The account server 270 can also track performance of players, machines, and servers.

The wagering game system architecture 200 can also include a wagering game server 250 configured to control wagering game content, provide random numbers, and communicate wagering game information, account information, and other information to and from a client 260. The wagering game server 250 can include a content controller 251 configured to manage and control content for the presentation of content on the client 260. For example, the content controller 251 can generate game results (e.g., win/loss values), including win amounts, for games played on the client 260. The content controller 251 can communicate the game results to the client 260. The content controller 251 can also generate random numbers and provide them to the client 260 so that the client 260 can generate game results. The wagering game server 250 can also include a content store 252 configured to contain content to present on the client 260. The wagering game server 250 can also include an account manager 253 configured to control information related to player accounts. For example, the account manager 253 can communicate wager amounts, game results amounts (e.g., win/loss amounts), bonus game amounts, etc., to the account server 270. The wagering game server 250 can also include a communication unit 254 configured to communicate information to the client 260 and to communicate with other systems, devices and networks. The wagering game server 250 can also include a social communication controller 255 configured to control social communication applications and other such mechanisms (e.g., chat, instant message, text messaging, etc.) associated with a wagering game session. The wagering game server 250 can also include a selection module 256 configured to automatically detect pre-configurations regarding content that a gaming user would like to select and transfer to and from a social communication console (e.g., a chat console) associated with a wagering game session. The selection module 256 can also gather content information (e.g., content metadata, content object data, etc.) about the selected content (e.g., movie files, sounds, picture files, links, descriptions, pre-set messages, associated discounts, Internet websites, etc.). The selection module 256 can also determine selection information, based on a method or mechanism of selection (e.g., a click, a lasso movement, a keystroke, etc.) that reveals the gaming user's purpose for selecting the content. In some embodiments, the content information can be associated with (e.g., programmed into, linked to, etc.) the content so that when instances of the content are selected the wagering game server 250 can determine what to do with the selected content. The selection module 256 can communicate the content information to an object transfer module 257. The object transfer module 257 can be configured to generate representations of the selected content, package metadata into the representations, and transfer the representations between social communication interfaces and/or gaming interfaces. The object transfer module 257 can also be configured to perform activities associated with the content and/or the metadata. Further, the object transfer module 257 can be configured to perform activities associated with activity settings that are either pre-set by the user or specified by the gaming user during selection, movement, or release of selectable content. The object transfer module 257 can also work in conjunction with the social communication controller 255 to perform the aforementioned activities (e.g. interact with social contact identifiers, generate chat messages with embedded content, etc.). The object transfer module 257 can also interact with the account server 270 to determine activities associated with a wagering game player account and interact with the wagering game player account to perform the activities (e.g., transfer money between accounts via a chat console, share video replays of gaming activity via a chat console, etc.).

The wagering game system architecture 200 can also include the client 260 configured to present wagering games and receive and transmit information to control interactivity for gaming and social-communication applications. The client 260 can be a computer system, a personal digital assistant (PDA), a cell phone, a laptop, a wagering game machine, or any other device or machine that is capable of processing information, instructions, or other data provided via a communications network 222. The client 260 can include a content controller 261 configured to manage and control content and presentation of content on the client 260. The client 260 can also include a content store 262 configured to contain content to present on the client 260. The client 260 can also include a gaming social communication module 263 configured to control interactivity between gaming interfaces, social communication applications, and other applications that run on, or are presented by, the client 260. The gaming social communication module 263 can determine selections of selectable and movable content presented on the client 260 via web browsers, rendered gaming displays, desktops, or other presentations of content. The gaming social communication module 263 can also control movement of, and perform functions associated with, the selectable and movable content between applications and application modules.

The wagering game system architecture 200 can also include a web server 280 configured to control and present an online website that hosts wagering games. The web server 280 can also be configured to present multiple wagering game applications on the client 260 via a wagering game website or other gaming-type venue accessible via the Internet. The web server 280 can host an online wagering website and/or a social networking website. The web server 280 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The web server 280 can also be configured to provide pre-configured web content to the client 260 to present, such as wagering game website pages that includes selectable content.

The wagering game system architecture 200 can also include a social networking communication server 290 configured to host social networking accounts, provide social networking content, control social networking communications, store associated social contacts, etc. The social networking communication server 290 can also provide chat functionality for a social networking website, a chat application, or any other social networking communications mechanism. In some embodiments, the social networking communication server 290 may include and/or be referred to interchangeably as a chat server.

Each component shown in the wagering game system architecture 200 is shown as a separate and distinct element connected via the communications network 222. However, some functions performed by one component could be performed by other components. For example, the wagering game server 250 can also be configured to perform functions of the gaming social communication module 263, and other network elements and/or system devices. Furthermore, the components shown may all be contained in one device, but some, or all, may be included in, or performed by multiple devices, as in the configurations shown in FIG. 2 or other configurations not shown. For example, the account manager 253, the communication unit 254, the social communication controller 255, the selection module 256, and the object transfer module 257 can be included in the client 260 instead of, or in addition to, being a part of the wagering game server 250. Further, in some embodiments, the client 260 can determine wagering game outcomes, generate random numbers, etc. instead of, or in addition to, the wagering game server 250.

As mentioned previously, in some embodiments, the client 260 can take the form of a wagering game machine. Examples of wagering game machines can include floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, clients and wagering game servers work together such that clients can be operated as thin, thick, or intermediate clients. For example, one or more elements of game play may be controlled by the client or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the clients can present a graphical representation of such outcome or asset modification to the user (e.g., player). In a thick-client example, the clients can determine game outcomes and communicate the outcomes to the wagering game server for recording or managing a player's account.

In some embodiments, either the client or the wagering game server(s) can provide functionality that is not directly related to game play. For example, account transactions and account rules may be managed centrally (e.g., by the wagering game server(s)) or locally (e.g., by the client). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
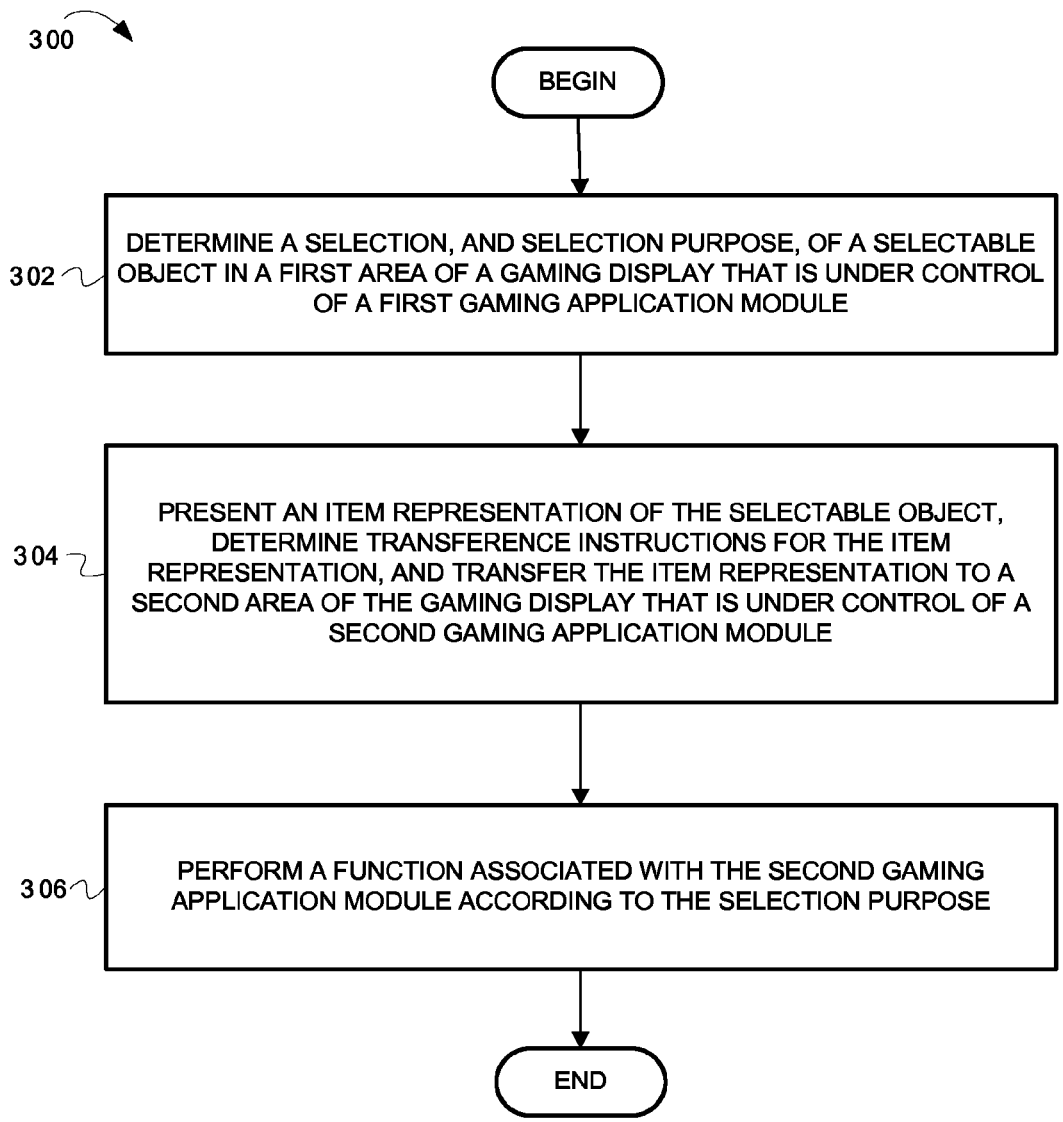
FIG. 3 is a flow diagram 300 illustrating selecting and transferring selectable content between gaming applications and social-communication application, according to some embodiments.

FIG. 3 is a flow diagram ("flow") 300 illustrating selecting and transferring selectable content between applications during a gaming session, according to some embodiments. FIGS. 1, 4, 5, and 6 are conceptual diagrams that help illustrate the flow of FIG. 3, according to some embodiments. This description will present FIG. 3 in concert with FIGS. 1, 4, 5 and 6. In FIG. 3, the flow 300 begins at processing block 302, where a wagering game system ("system") determines a selection and selection purpose of a selectable object in a first area of a gaming display that is under control of a first gaming application module. In some embodiments, the first application module can belong to a wagering game application or a social communication application associated with a wagering game session. In some embodiments, the social communication application can include a chat console, an instant messaging interface, etc., that enables social communications between social contacts. In some embodiments, the system can determine a selection action for the selectable object via one or more input/selection mechanisms, as a secondary result of an action, or by other ways. For example, a player can perform the selection action via a mouse click, a mouse double-click, a mouse click and drag, a mouse drag and drop, a specialized cursor movement, a keyboard key stroke, a hotkey combination, a key combination plus mouse movement, a touch-pad motion, a roller ball action, a voice command, a drop-down menu movement, an arrow-key movement, etc.). FIG. 1 above illustrated some examples of selection actions. In other examples, the system can perform the selection action as a secondary result of an instruction or activity made by the player, the game, a device, etc. (e.g., a royal flush occurs in a game and the game selects an item and drags it to the player's inventory, a player adds a credit and the system generates a floating coin that the player can direct to a social contact account or chat console, etc.).

In some embodiments, the system can unlock selectable objects as a reward for performing accomplishments or other gaming activities. In other words, the system can unlock selection and movement functionality for certain objects. Thus, objects in certain areas of a gaming display may appear to be non-selectable until the player account complies with pre-determined requirements (e.g., bets a certain amount of money, wins a certain privilege, reaches a certain status level, accomplishes a goal, etc.). The system can then unlock one or more selectable objects.

Figure 4:
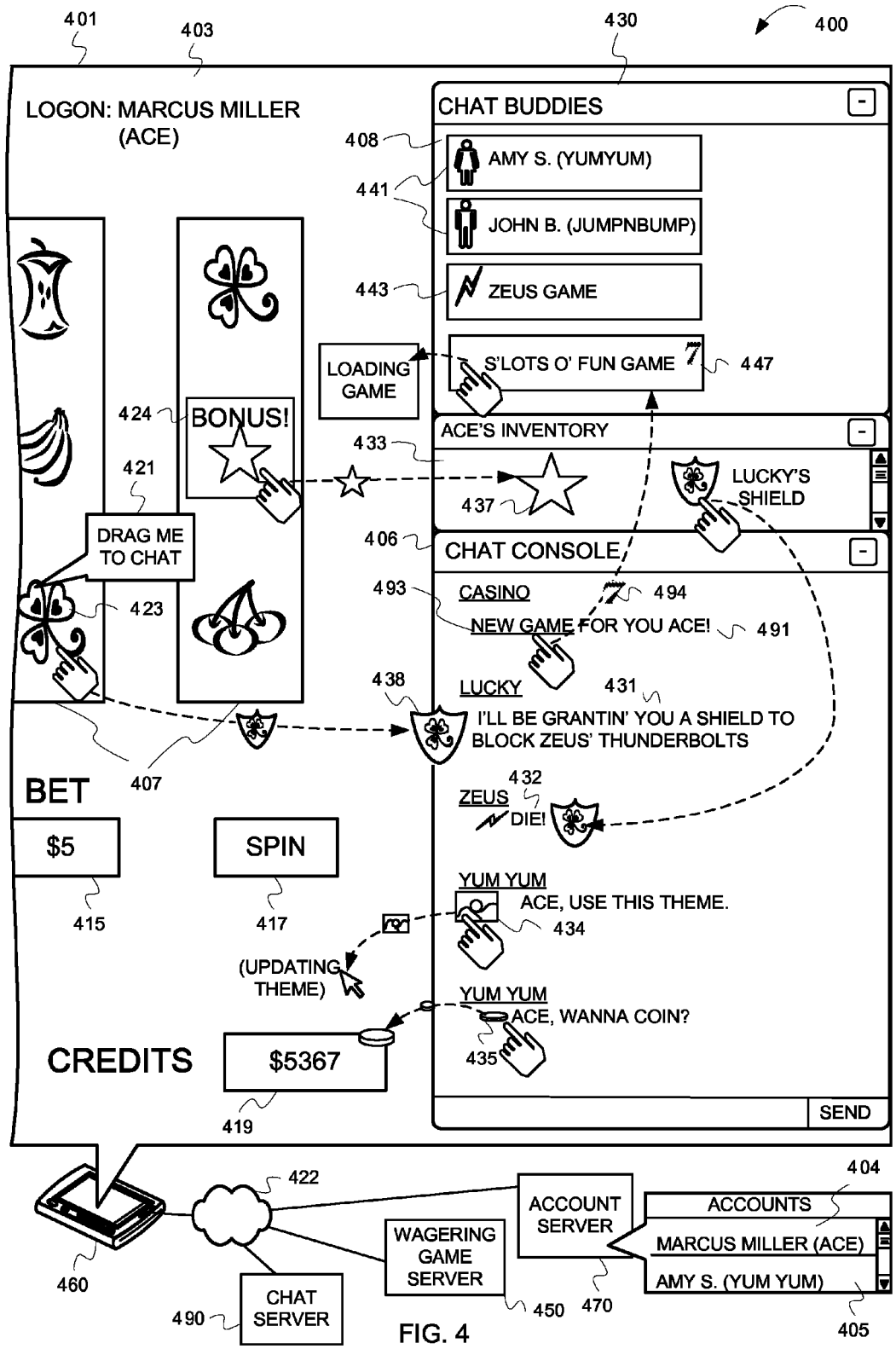
FIG. 4 is an illustration of controlling drag-and-drop selections of objects between a wagering game machine interface and a chat application, according to some embodiments.

In some embodiments, the system can present selectable objects on a wagering game machine display. For example, FIG. 4 is an illustration of controlling drag-and-drop selections of objects between a wagering game machine interface and a chat application. In FIG. 4, a wagering game system ("system") 400 includes a wagering game machine 460 connected to a wagering game server 450, an account server 470, and a chat server 490 via a communications network 422. The wagering game machine 460 presents a display 401 of a wagering game interface 403. The wagering game machine 460 also presents a chat application 430 in the display 401. The wagering game interface 403 presents a slot game with reels 407, a bet meter 415, a spin button 417, and a credit meter 419 any of which can be, or can include, selectable items or objects. A player account 404 can log in to the wagering game machine 460 for a wagering game session.

Returning to the processing block 302, in some embodiments, the system can determine a selection purpose (intent, motive, reason, condition, etc.) for the selection by detecting a purpose selection action by the player account, by a pre-programmed instruction, by analytics, by system prompts, or in other ways. For example, selection purpose can be pre-programmed into the selectable wagering game content item so that a single and/or default activity by the player (e.g., a left mouse-click) will indicate a default selection purpose (e.g., select a graphical copy of an image).

In another example, the system can determine a selection purpose via analytics. The system can analyze details, characteristics, properties, etc., about the player account, the player's playing history, the selected item, the events of the session, environmental events, etc. to extrapolate the selection purpose (e.g., when a significant win occurs and is followed by a selection action, the system can assume that the player intends to save a replay copy of the significant win, especially if the player history shows that the player consistently saves a copy of the video replay after a big win).

Figure 5:
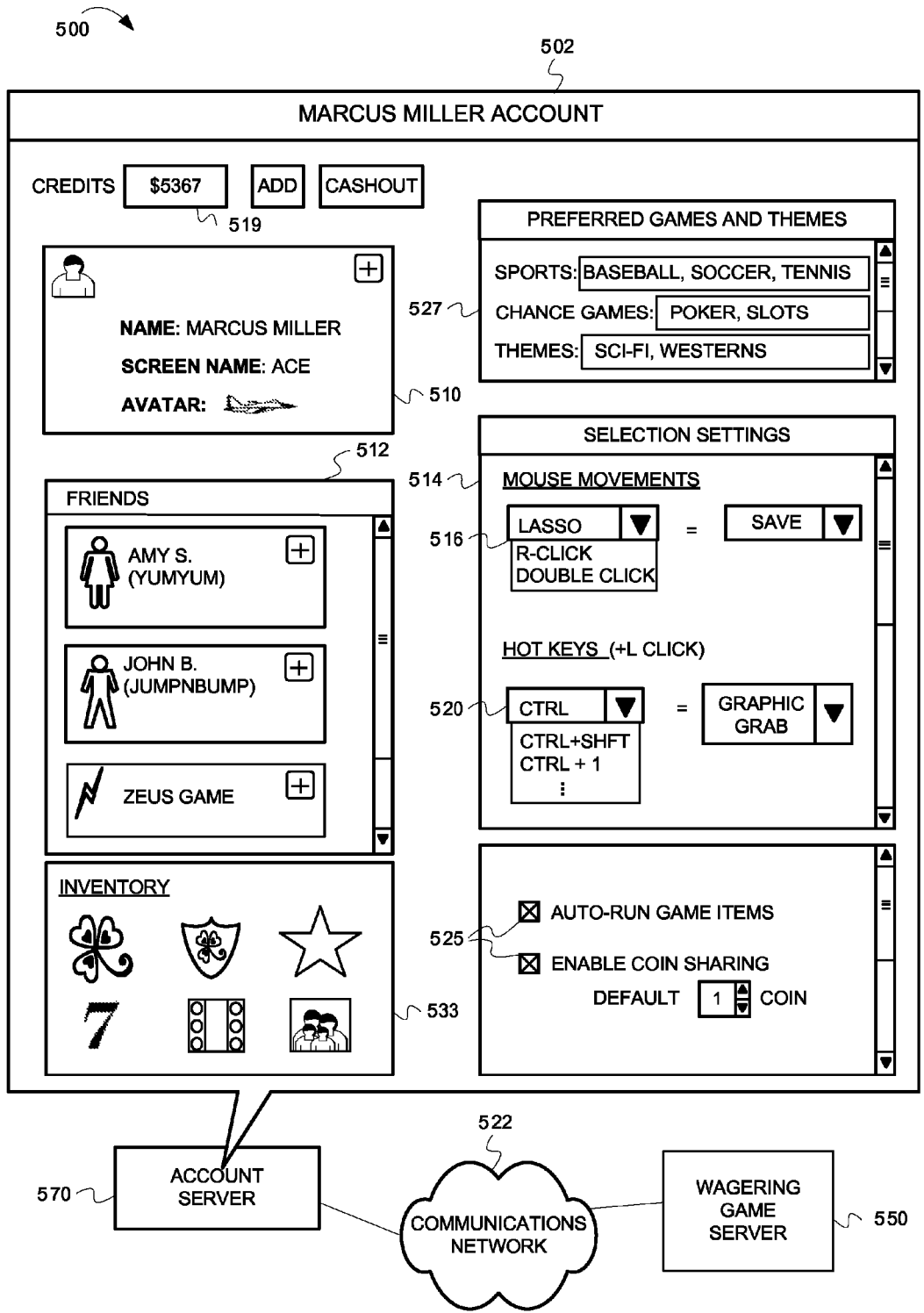
FIG. 5 is an illustration of configuring a wagering game player account with selection settings for transferring selectable objects, according to some embodiments.

In another example, the system can determine a selection purpose based on a player input or a player selection action. For instance, one type of player input, as described previously, can include the player account selecting a menu option that specifies the specific purpose of the selection. The system can prompt the selection purpose and present options for a player account to select the selection purpose from a drop-down list, a menu, or other option selection mechanism when the selection purpose is not clear. Another type of input may include hotkeys, key combinations, mouse movements, etc. The system can also refer to player settings to interpret what a player's selection actions mean. FIG. 5 is an illustration of configuring a wagering game player account with selection settings for transferring selectable objects, according to some embodiments. In FIG. 5, a wagering game system ("system") 500 includes an account server 570 connected to a wagering game server 550 via a communications network 522. The account server 570 includes a player account 502. The player account 502 can include account settings, including a credit balance 519, identification information 510, social contact information 512, game related preferences 527, etc. The player account 502 can also include selection settings 514 that identify selection purposes for specific selection activities. For example, a mouse movement setting 516 can specify a selection purpose for mouse movements. A hot-key setting 520 can specify selection purposes for hot-keys or various types of keyboard key combinations. The player account 502 can also include other settings 525 that enable certain functionality related to selecting and receiving selectable objects. The player account 502 can also include an inventory 533 of items that were selected and received during wagering game sessions.

Returning to FIG. 3, the flow 300 continues at processing block 304, where the system presents an item representation of the selectable object, determines transference instructions for the item representation, and transfers the item representation to a second area of the gaming display that is under control of a second gaming application module. In some embodiments, the system transfers items between areas on the gaming display that are controlled by separate and distinct applications, such as from a wagering game application to a social communication application. In other embodiments, however, the system transfers items between areas of the gaming display that are controlled by different modules of the same application, such as from a chat console on a chat application to a social contacts list of the same chat application. The first application module can perform functions that are different from functions performed by the second application module.

In some embodiments, the system can generate a visually representative object that represents the selected object based on the selection action, selection purpose, or content characteristics. For example, if a player selects the content with the intent to save or share a video replay of a gaming event, the system can generate an image of a video clip that the player can drag to a chat console. In another example, if the player selects a credit meter with the intent to share a coin, the system can generate a coin graphic, which the player can drag and drop on a social contact identifier. In some embodiments, the system can associate and persist (e.g., store, embed, etc.) the selection purpose with the item representation. For instance, the system can store a description of the selection purpose as metadata of the item representation. The metadata can persist with the item representation and can be used when a player, or the system, shares or uses the item representation. In one example, the system can determine that the selection purpose for a content item is to share a video replay. The system can consequently generate an item representation that looks like a video-clip graphic. The system can write the video-clip graphic into the item representation's metadata so that the video-clip graphic stays with the item representation. The system can also write into the metadata an intent identifier that identifies the item representation as a video-replay. When the system later uses the item representation (e.g., embeds it into a chat message, sends it via email, drops it on a social contact identifier, etc.) the metadata persists with the item representation as an object. The item representation can persist as an object beyond the duration of the wagering game session and/or beyond the duration of a social communication session (e.g., the system can store the item representation in an inventory, which stores the item representation as a persistent object in the player account). In other embodiments, however, the item representation can expire when the wagering game session expires and/or when a social communication session expires.

In FIG. 1, for example, the system 100 can generate metadata of a selection purpose after the player account 104 selects an item and indicates a purpose for the selection. For instance, when the player account 104 selects the reel element 172, the system 100 can assign (e.g., store, associate, etc.) the purpose for the selection (i.e., the intent to make a replay video) with the item representation 111 as metadata. Because the system 100 assigns the metadata to the item representation 111, the item representation 111 can be stored as a persisted object in the inventory 133 or sent via instant message, chat, email, etc.

Returning to FIG. 3, in some embodiments, a selectable object can have pre-configured metadata, which the system uses to generate persisted item representations that represent the selected items. In other words, the system may not offer an option for the player to indicate a selection purpose because the selectable object may only offer a single, pre-determined function or purpose. For example, in FIG. 4, the player account 404 can receive a wagering game bonus item 424, which can be dragged and dropped into an inventory 433. When the player account 404 selects the wagering game bonus item 424, the system 400 can generate an item representation 437 that resembles the wagering game bonus item 424. Later, the player account 404 can access the inventory 433 and see the item representation 437, and any other inventory items, that the player account 404 has selected and saved. The player account 404 can later share the item representation 437 with friends via email, a file sharing or social network website (e.g., YouTube™), a chat message, or any other form of social communication. Further, when the player account 404 captures (e.g., selects, drags, and drops the item representation 437 on the inventory 433), the system 400 can automatically assign additional metadata to the item representation 437, such as a link to a screen capture of the slot game that provided the bonus, a video replay of the slot game, or other data associated with the bonus game, the slot game, the player account 404, the wagering game machine 460, etc. For example, the item representation 437 can include information such as a time stamp for when the player account 404 saved the item representation 437. The item representation 437 can persist within the inventory 433 beyond the duration of a wagering game session or a chat session. The system 400 can also detect when the player drags the item representation 437 beyond the confines of the display 401 onto other applications (e.g., an email client, a document, a web browser, an application, etc.).

In another example, the system 400 can present a pop-up message 421 that requests that the player account 404 select a reel element (e.g., a three-leaf clover object 423). When the player selects the three-leaf clover object 423, the system 400 generates an item representation 438 that is related to the pre-determined purpose for the three-leaf clover object 423. The pre-determined purpose may be related to a social communication game or a bonus wagering game.

Returning to the processing block 304 the system can determine transference instructions by transfer actions performed by the wagering game player. For example, the system can determine player input movements or actions (e.g., a "drag" movement that moves a mouse pointer's position after a mouse-click, a depression of an arrow key after a mouse click, etc.). In other embodiments, the system can determine transference instructions by system activity or pre-programmed instructions. For example, the system can determine transference instructions when a player double-clicks on an item and the system refers to transfer instructions associated with a double-click action. The transfer instructions instruct the system to automatically move the item to a chat console. In another example, the system can make an item disappear from the game console and reappear in the chat console, or the system can move the item representation without player interaction (e.g., the system causes the item representation to float across a player's display into a chat console). The system can present a visual representation of movement by the item representation in accordance with the transference instructions (e.g., a visual depiction of the representative item so that a mouse cursor can move the visually representative item across a screen, a visual depiction of the representative item materializing at a chat console destination, etc.). In other embodiments, however, the system does not have to visually present the transfer of the item representation (e.g., the system could select the item from the game interface, such as a double-click action, and the system could automatically generate a message in the chat console showing the representation, or the system could transfer the representation of the object directly to an inventory).

In some embodiments, the system can determine transference instructions via touch-screen inputs. For example, in FIG. 4, the player account 404 can drag and drop items from a chat console 406 on a buddy list (i.e., a social contacts console 408) by touching the display 401. For instance, the casino can send a chat message 491 to the player account 404 using the chat console 406. The chat message 491 can contain a link 493 to new or exclusive content that the player account 404 has earned via a rewards system, player status, etc. The player associated with the player account 404 touches the link 493 on the display 401. In some embodiments, the player can maintain contact with the display 401 and move, or drag, the finger across the display 401. The system 400 can recognize that the player's finger remains on the display 401. The system 400 can to track the motion of the player's finger and generate transference instructions to an item representation 494 associated with the link 493 in accordance with the player's finger motion. When the player releases their finger from the display 401, the system 400 generates a release instruction to release the item representation 494 onto the social contacts console 408. The system 400 can generate a social-contact chat object 447 that represents the new or exclusive content (e.g., the player account 404 receives the "S'lots O' Fun" game application before other player accounts). The player account 404 can later drag and drop the social-contact chat object 447 onto the wagering game interface 403 to launch the game. In other embodiments, the player account 404 can drag and drop the item representation 494 directly into the wagering game interface 403, and the system 400 can automatically put the social-contact chat object 447 into the social contacts console 408. In other embodiments, the system 400 can store the new or exclusive content in the inventory 433 instead of, or in addition to, in the social contacts console 408.

In some embodiments, the player account 404 can share the new or exclusive content with friends. For example, the player account 404 can drag and drop the social-contact chat object 447 onto social-contact chat objects 441, which represent friends, or other social contacts, that are associated with the player account 404, such as a player account 405. The system 400 can send a message to the social contacts presenting them a link to the new or exclusive game content. In other embodiments, however, the system 400 can place item representations (e.g., a game icon) of the new or exclusive game content into the social contact's instance of an inventory or a social contact console. The social contact can then drag and drop the game icon onto their instance of a game interface to launch or load the game. In some embodiments, the system 400 can set up preferred methods of sending messages (e.g., to friends' cell phones or to friends' email accounts). For example, the system 400 can launch a drop-down menu that asks whether to send to messages to a friend's email, cell phone, etc. In another example, the system 400 can display remote devices (e.g., cell phones) as objects within a social communication application. The remote devices can belong to a social contact (e.g., a friend) for the player account 404. When the player account 404 drags and drops an item representation onto the device object, the system 400 can send a message to the remote device.

The flow 300 continues at processing block 306, where the system performs a function associated with the second gaming application module according to the selection purpose. For example, the system can communicate an item representation via the social communication application using functionality of the social communication application. In some embodiments, the system can determine a position of an item representation over a receiving chat object, determine a release action, determine a social communication function associated with the release location or action, and perform the social communication function using the item representation. For example, the system can determine that the player has positioned the item representation over a social contact identifier in the social contact console. The release action can be a mouse release action, a second click, the "Enter" key, etc., that releases the item representation on the receiving chat object. The system can determine that a specific function is associated with the position, or location, of where the item representation was released or deselected (e.g., dropped). For instance, the system can determine that the item representation was dropped in a chat interface. As a result, the system can determine that it should perform a chat-message creation action. The system can then create a chat message associated with the release action. In some embodiments, the system uses the receiving object and/or the item representation in the social communication function. For example, the system can determine that a player drops a coin on a social contact. The system can determine that a chat-message creation action should be performed. The system, thus, generates a message in the chat console and embeds an additional selectable object, such as a coin object, a link, etc. in the message so that the social contact can select the additional selectable object. Other examples of social communication functions may include a transference function where the system transfers an asset from one account to another using the social communication application, an invitation function, wherein the system invites one player to interact with another player, a game share function where the system shares game content from one account with another account, and so forth. In FIG. 4, for example, the player account 405 (i.e., "YumYum) transferred a coin object 435 via the chat console 406. The player account 404 (i.e., "Ace") which is logged on to the wagering game machine 460, can drag the coin object 435 onto the credit meter 419. The coin object 435 includes metadata that describes the value of the coin object 435 (e.g., one credit value, five credit values, etc.) as intended by the sending player account 405 (i.e., YumYum). The system 400 can detect that the coin object 435 has descriptive metadata indicating the value for the coin object 435. When the player account 404 (i.e., Ace) moves the coin object 435 over the credit meter 419, the system 400 determines that the function of the credit meter 419 is to track credits, and, subsequently, the system 400 can perform coin-in instructions that will add the credit values of the coin object 435 to a credit balance for the player account 404. Further, in another example, the player account 405 sends to the player account 404 a message that contains a theme object 434. The player account 404 can drag the theme object 434 onto a background area for the wagering game interface 403. The system 400 can determine that when a theme related object, like the theme object 434, is dropped onto the background area, the system 400 performs theme-changing instructions that will change the theme of the wagering game interface 403 to a theme encoded into the metadata of the theme object 434.

Returning to FIG. 3, in some embodiments, the system performs associated wagering game functions in accordance with selection and/or transfer purposes. For example, the system can determine a social-communication content item is selected, determine a purpose for the selection, generate a social-communication content item representation, transfer the social-communication content item representation to the wagering game interface, and perform a wagering game function in accordance with the purpose for the selection. The system can, for example, provide selectable objects that a player can use to set up personal progressives. In another example, the system can provide selectable objects that can perform wagering game functionality within the social communication application. For example, in FIG. 4, the item representation 438 can represent a shield object that, when dragged and dropped on the chat console 406, puts the shield object into the inventory 433 for the player account and generates a message 431 explaining what the shield object can be used for. The shield object can be used as part of a social communication with a gaming bot (e.g., represented by the social-contact chat object 443). The social-contact chat object 443 can be for a wagering game called "Zeus." The wagering game can present a message 432 that provides a reward, or indicates a challenge. The player can drag the shield object, which is a persisted object generated from the item representation 439, from the inventory 433 to the chat console 406 to interact with the game bot in a game. The effect of dragging the shield object from the inventory 433 to the chat console 406 can generate a gaming activity, or interaction, that accepts the reward, participates in the challenge, etc., as proposed by the game bot (e.g., the shield object can deflect Zeus' lightning bolt presented in the message 432). The interaction can result in an additional game (e.g., because the player blocked Zeus' lightning bolt, the system 400 launches a bonus game). In some embodiments, the interaction can affect the main game in the wagering game interface 403 (e.g., provides a free credit, provides a credit multiplier feature, provides an extra pay-line, provides a higher betting limit, provides access to a new game level, etc.).

In some embodiments, the system can provide functions that transfer benefits between player accounts using selectable objects. For example, a player account can give a benefit to friend by authorizing wagering, giving funds (see the item representation 143 of a coin in FIG. 1), etc. In another example, the system can provide wagering game challenge functions to challenge friends (see the dropdown menu 175 in FIG. 1). For example, a player account can bet a friend (e.g., a 50 credit bet) that the player account can win over the next 50 lines on a slot game. The system can present similar options on instances of objects that are viewed by the friend, so that the friend can counter the bet. In some embodiments, the system can provide selectable objects that a player can use to initiate a personal tournament by dragging and dropping friends into a game or a game preview area. For example, several player accounts can convene in a gaming event/location (e.g., a bar, a convention, etc.) and sign up to participate in a tournament. The player accounts can log on to individual gaming stations at the event. The event host can receive sign-up fees and log on to a casino website. The event host can drag selectable objects that represent all paying tournament members (i.e. player accounts) onto a queue for the casino website. Then, once the event host has finished dragging all the selectable objects members onto the queue, the event host initiates the game and the casino website launches the game for all tournament members.

Figure 6:
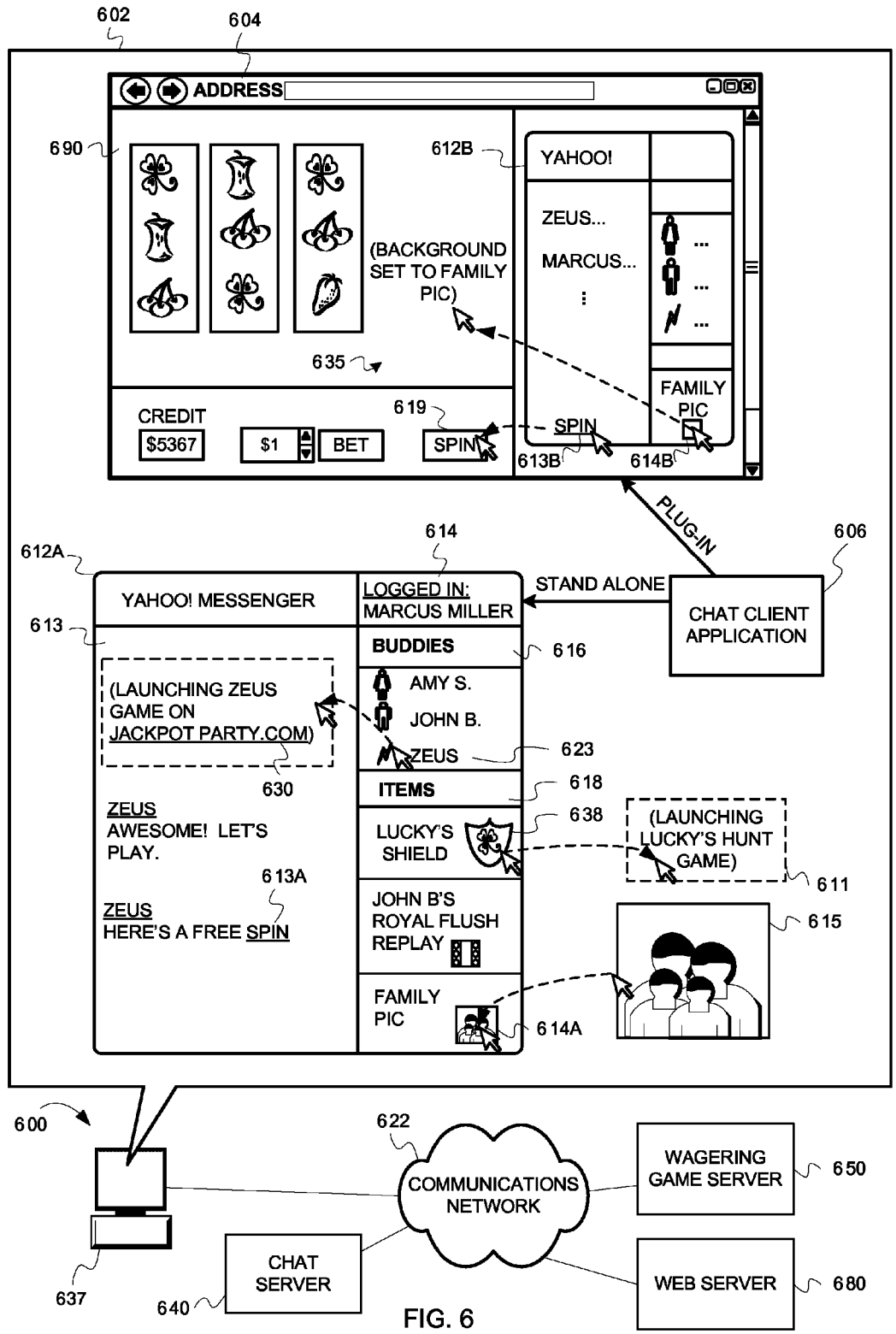
FIG. 6 is an illustration of controlling drag-and-drop selections of objects between a gaming interface, a chat application interface, and a computer desktop, according to some embodiments.

In some embodiments, the system can transfer selected client items to a gaming interface or to a social communication application. The client items can be selectable objects that are stored on a client device. For example, the system can determine that a client item is selected, determine a purpose for the selection, generate a client item representation, transfer the client item representation to the wagering game interface or the social communication application, and perform either a wagering game function or a social communication function in accordance with the purpose for the selection. For example, the client item can be a file on the client's desktop as exemplified in FIG. 6. FIG. 6 is an illustration of controlling drag-and-drop selections of objects between a gaming interface, a chat application interface, and a computer desktop, according to some embodiments. In FIG. 6, a wagering game system ("system") 600 includes a computer 637 connected to a web server 680, a wagering game server 650, and a chat server 640 via a communications network 622. The computer 637 can present a graphical user interface (GUI) 602. The GUI 602 can include a browser application 604 that presents a website 690 for a network wagering venue, hosted by the web server 680. The web server 680 can work in conjunction with the wagering game server 650 to present wagering game content on the website 690. The website 690 can include wagering game components (e.g., reels or other game play elements, credit meters, bet meters, game controls, etc.). The website 690 can also integrate a chat client application 606 (e.g., Yahoo® Messenger™, MySpaceIM™, AIM®, ICQ®, Skype™, Pidgin™, Trillian™, etc.) as a plug-in to the browser application 604. In other embodiments, the chat client application 606 can function as a stand-alone application on the computer 637. The chat client application 606 can communicate with the chat server 640 to communicate chat messages.

In some embodiments, the chat client application 606 can launch a chat client instance 612A. The chat client instance 612A can include a list of social contacts (e.g., buddy list 616). Some of the social contacts, such as social contacts can be for social network accounts that are linked to, or acquainted with, a user account 614. The user account 614 can be a chat account or other social network account that communicates with the chat server 640 via the chat client instance 612A.

Some of the social contacts can represent game bots (e.g., social contact 623 associated with a game bot for a wagering game called "Zeus"). The user account 614 can use the chat client instance 612A to play wagering games by dragging and dropping the social contact 623 onto a chat interface 613. The chat client application 606 can send instructions to the wagering game server 650 to launch the Zeus game on the website 690. The chat client application 606 provides a message 630 that indicates that the Zeus game is loading in the browser application 604. The game bot associated with the social contact 623, can communicate with the user account 614 and can send selectable objects within the chat interface 613 (e.g., the game bot sends a link 613A for a free spin on the Zeus game). The game bot can also logon a player account associated with the user account 614 to the wagering game server 650.

The chat client instance 612A can also include an item inventory 618 which the user account 614 can use to access stored items. One of the items in the item inventory 618 can be a persisted object 638 that the player received during a wagering game session. The persisted object 638 can have game functionality assigned to it that can perform wagering game activities when the persisted object is used on the website 690. Outside of the website 690, however, the persisted object can perform non-wagering game activity. For instance, when a user drags the persisted object 638 onto a desktop for the computer 637, the computer 637 can launch a game application 611 (e.g., a server-based Flash game, a local game application, etc.). In some embodiments, the player account can drag and drop personal content from outside of the chat client instance 612A into the item inventory 618. For instance, a user can select an image file 615 and drag it into the item inventory 618. The chat client application 606 can generate an item representation 614A of the image file 615. In some embodiments, the item representation 614A can include metadata that points to the image file 615 stored on the computer 637. The user account 614 can use the item representation 614A within the chat client instance 612A or in another chat client instance 612B. More specifically, the computer 637 launches the browser application 604 and presents the chat client instance 612B, which is a plug-in version of the chat client application 606. The chat client instance 612B can present any data already presented in the chat client instance 612A. For example, the chat client instance 612B can present an item representation instance 614B of the item representation 614A. A user can drag the item representation instance 614B onto a background 635 for the website 690. The website 690 can use the item representation instance 614B to present a copy of the image file 615 on the background 635. In another embodiment, a user can select an instance link 613B of the link 613A and drag the instance link 613B onto a spin button 619 for the website 690. The system 600 can use the instance link 613B to perform a wagering game function (e.g., to process a free spin).

Further, herein some embodiments have described transferring objects between areas of a wagering game application and a social communication application, from areas on a web browser, from areas on a wagering game machine display, and from areas of a computer desktop. However, other embodiments can include transferring selectable objects from other applications such as from desktop widgets, online website widgets, cell-phone widgets, social network application windows, web-browser frames, web-browser toolbars, client applications, etc. Further, some embodiments can include transferring selectable objects between areas of one window (e.g., from different sections of a web browser window that presents different applications or different application modules) or between windows (e.g., from applications that run separately from each other in separate windows).

Additional Example Operating Environments

This section describes example operating environments, systems and networks, and presents structural aspects of some embodiments.

Wagering Game Computer System

Figure 7:
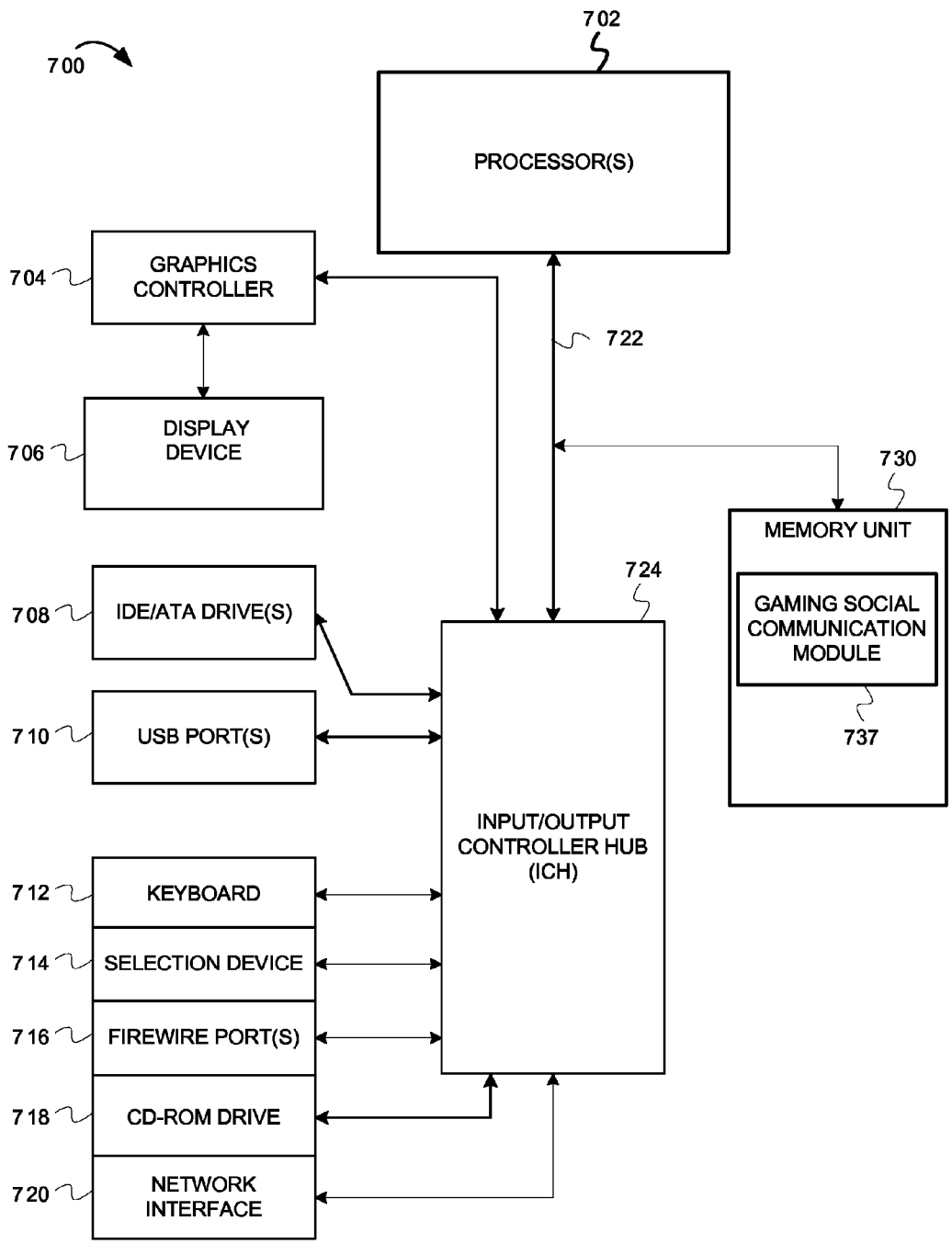
FIG. 7 is an illustration of a wagering game computer system 700, according to some embodiments.

FIG. 7 is a conceptual diagram that illustrates an example of a wagering game computer system 700, according to some embodiments. In FIG. 7, the computer system 700 may include a processor unit 702, a memory unit 730, a processor bus 722, and an Input/Output controller hub (ICH) 724. The processor unit 702, memory unit 730, and ICH 724 may be coupled to the processor bus 722. The processor unit 702 may comprise any suitable processor architecture. The computer system 700 may comprise one, two, three, or more processors, any of which may execute a set of instructions in accordance with some embodiments.

The memory unit 730 may also include an I/O scheduling policy unit 7 and I/O schedulers 7. The memory unit 730 can store data and/or instructions, and may comprise any suitable memory, such as a dynamic random access memory (DRAM), for example. The computer system 700 may also include one or more suitable integrated drive electronics (IDE) drive(s) 708 and/or other suitable storage devices. A graphics controller 704 controls the display of information on a display device 706, according to some embodiments.

The input/output controller hub (ICH) 724 provides an interface to I/O devices or peripheral components for the computer system 700. The ICH 724 may comprise any suitable interface controller to provide for any suitable communication link to the processor unit 702, memory unit 730 and/or to any suitable device or component in communication with the ICH 724. The ICH 724 can provide suitable arbitration and buffering for each interface.

For one embodiment, the ICH 724 provides an interface to the one or more IDE drives 708, such as a hard disk drive (HDD) or compact disc read only memory (CD ROM) drive, or to suitable universal serial bus (USB) devices through one or more USB ports 710. For one embodiment, the ICH 724 also provides an interface to a keyboard 712, selection device 714 (e.g., a mouse, trackball, touchpad, etc.), CD-ROM drive 718, and one or more suitable devices through one or more firewire ports 716. For one embodiment, the ICH 724 also provides a network interface 720 though which the computer system 700 can communicate with other computers and/or devices.

The computer system 700 may also include a machine-readable medium that stores a set of instructions (e.g., software) embodying any one, or all, of the methodologies for control interactivity for gaming and social-communication applications. Furthermore, software can reside, completely or at least partially, within the memory unit 730 and/or within the processor unit 702. The computer system 700 can also include a gaming social communication module 737. The gaming social communication module 737 can process communications, commands, or other information, to control interactivity for gaming and social-communication applications. Any component of the computer system 700 can be implemented as hardware, firmware, and/or machine-readable media including instructions for performing the operations described herein.

Personal Wagering Game System

Figure 8:
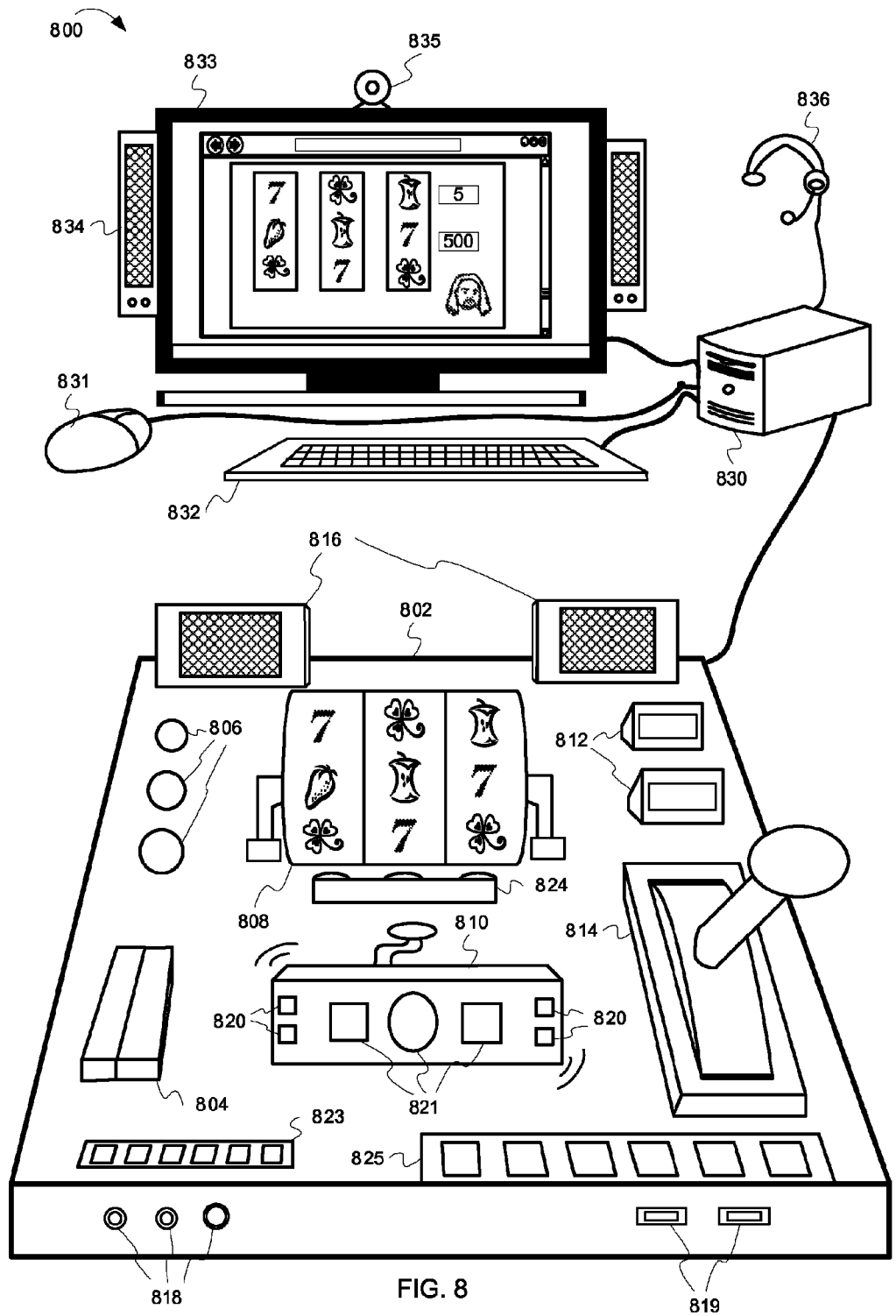
FIG. 8 is an illustration of a personal wagering game system 800, according to some embodiments.

FIG. 8 is a conceptual diagram that illustrates an example of a personal wagering game system 800, according to some embodiments. In FIG. 8, the personal wagering game system ("system") 800 includes an exemplary computer system 830 connected to several devices, including user input devices (e.g., a keyboard 832, a mouse 831), a web-cam 835, a monitor 833, speakers 834, and a headset 836 that includes a microphone and a listening device. In some embodiments, the webcam 835 can detect fine details of a person's facial features, from an eye-level perspective. The web-cam 835 can use the fine detail to determine a person's identity, their demeanor, their facial expressions, their mood, their activities, their eye focus, etc. The headset 836 can include biometric sensors configured to detect voice patterns, spoken languages, spoken commands, etc. The biometric sensors in the web-cam 835 can detect colors (e.g., skin colors, eye colors, hair colors, clothing colors, etc.) and textures (e.g., clothing material, scars, etc.). The biometric sensors in the web-cam 835 can also measure distances between facial features (e.g., distance between eyes, distance from eyes to nose, distance from nose to lips, length of lips, etc.). The system 800 can generate a facial and body map using the detected colors, textures, and facial measurements. The system 800 can use the facial and body map to generate similar facial features and body appearances for a player account avatar. Also connected to the computer system 830 is a gaming control device ("gaming pad") 802 including wagering game accoutrements associated with wagering games. The wagering game accoutrements include one or more of prop reels 808, prop game meters 812, indicators 806, a game control device 810, a physical lever 814, a magnetic card reader 804, a video projection device 824, input/output ports 818, USB ports 819, and speakers 816. The gaming pad 802 can present feedback of online activities. For instance, the gaming pad 802 can use vibrations and signals on the gaming control device (e.g., the game control device 810 or the physical level 814 can vibrate to indicate a back pat from another player or a game celebration, the indicators 806 can blink, etc.). The physical lever 814 can produce feelings in the lever to emulate a pulling feel or a vibration. The video projection device 824 can project video onto the props reels 808 so that the prop reels 808 can present many different types of wagering games. The prop reels 808 can spin when the physical lever 814 is pulled. The video projection device 824 can project reel icons onto the prop reels 808 as they spin. The video projection device 824 can also project reel icons onto the prop reels 808 when the prop reels 808 are stationary, but the imagery from the video project device 824 makes the prop reels 808 appear to spin. The magnetic card reader 804 can be used to swipe a credit card, a player card, or other cards, so that the system can quickly get information. The system 800 can offer lower rates for using the magnetic card reader 804 (e.g., to get a lower rate per transaction). The game control device 810 can include an emotion indicator keypad with keys 820 that a player can use to indicate emotions. The game control device 810 can also include biometric devices 821 such as a heart-rate monitor, an eye pupil dilation detector, a fingerprint scanner, a retinal scanner, voice detectors, speech recognition microphones, motion sensors, sound detectors, etc. The biometric devices 821 can be located in other places, such as in the headset 836, within a chair (not shown), within personal control devices (e.g. joysticks, remote controls, game pads, roller-balls, touch-pads, touch-screens, etc.), within the web-cam 835, or any other external device. The external devices can be connected to the computer 830 or to the game control device 810 via the input/output ports 818. As a security feature, some biometric devices can be associated with some of the gaming pad devices (e.g., the magnetic card reader 804), such as a fingerprint scanner, a retinal scanner, a signature pad to recognize a player's signature, etc. The game control device 810 can also use the keys 820 to share items and control avatars, icons, game activity, movement, etc. within a network wagering venue. The game pad can also have an electronic (e.g., digital) button panel 825, an electronic control panel 823, or any other type of changeable panel that can change appearance and/or configuration based on the game being played, the action being performed, and/or other activity presented within an online gaming venue. The game control device 810 can also move in different directions to control activity within the online gaming venue (e.g., movement of a player's avatar moves in response to the movements of the game control device 810). Avatars can be pre-programmed to act and look in certain ways, which the player can control using the system 800. The gaming pad 802 can permit the player to move the avatar fluidly and more easily than is possible using a standard keyboard. The system 800 can cause an avatar to respond to input that a player receives via the gaming pad 802. For example, a player may hear a sound that comes primarily from one direction (e.g., via stereophonic signals in the headset 836) within the network wagering venue. The system 800 can detect the movement of the player (e.g., the system 800 detects that a player moves his head to look in the direction of the sound, the player uses the game control device 810 to move the avatar's perspective to the direction of the sound, etc.). The system 800 can consequently move the avatar's head and/or the avatar's perspective in response to the player's movement. The player can indicate an expression of an emotion indicated by the player using the keys 820. The system 800 can make the avatar's appearance change to reflect the indicated emotion. The system 800 can respond to other movements or actions by the player and fluidly move the avatar to respond. The system 800 can also interpret data provided by the biometric devices and determine expressions and/or indications of emotions for a player using the system 800.

Wagering Game Machine Architecture

Figure 9:
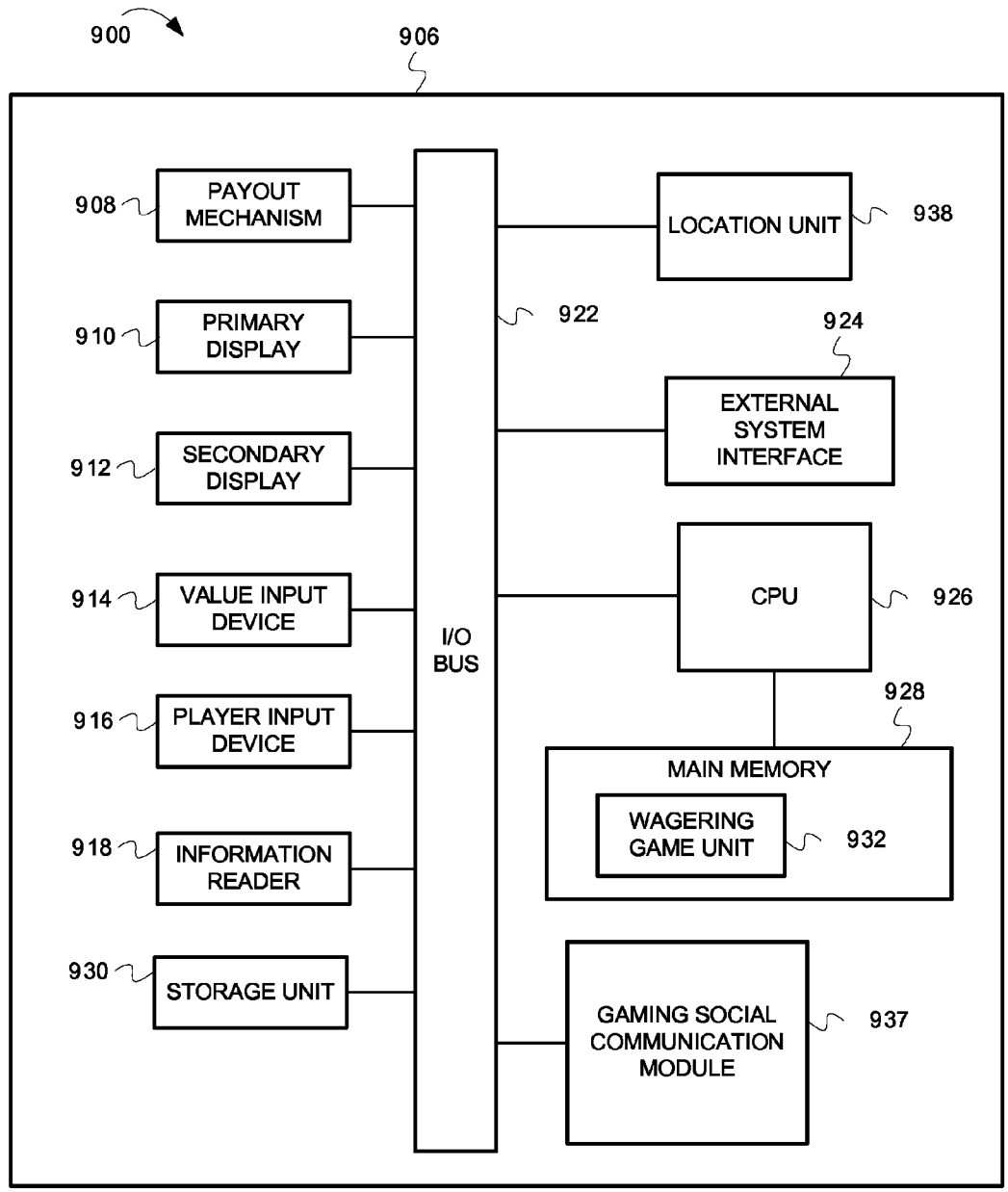
FIG. 9 is an illustration of a wagering game machine architecture 900, according to some embodiments.

FIG. 9 is a conceptual diagram that illustrates an example of a wagering game machine architecture 900, according to some embodiments. In FIG. 9, the wagering game machine architecture 900 includes a wagering game machine 906, which includes a central processing unit (CPU) 926 connected to main memory 928. The CPU 926 can include any suitable processor, such as an Intel® Pentium processor, Intel® Core 2 Duo processor, AMD Opteron™ processor, or UltraSPARC processor. The main memory 928 includes a wagering game unit 932. In some embodiments, the wagering game unit 932 can present wagering games, such as video poker, video black jack, video slots, video lottery, reel slots, etc., in whole or part.

The CPU 926 is also connected to an input/output ("I/O") bus 922, which can include any suitable bus technologies, such as an AGTL+ frontside bus and a PCI backside bus. The I/O bus 922 is connected to a payout mechanism 908, primary display 910, secondary display 912, value input device 914, player input device 916, information reader 918, and storage unit 930. The player input device 916 can include the value input device 914 to the extent the player input device 916 is used to place wagers. The I/O bus 922 is also connected to an external system interface 924, which is connected to external systems (e.g., wagering game networks). The external system interface 924 can include logic for exchanging information over wired and wireless networks (e.g., 802.11g transceiver, Bluetooth transceiver, Ethernet transceiver, etc.)

The I/O bus 922 is also connected to a location unit 938. The location unit 938 can create player information that indicates the wagering game machine's location/movements in a casino. In some embodiments, the location unit 938 includes a global positioning system (GPS) receiver that can determine the wagering game machine's location using GPS satellites. In other embodiments, the location unit 938 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 9, in some embodiments, the location unit 938 is not connected to the I/O bus 922.

In some embodiments, the wagering game machine 906 can include additional peripheral devices and/or more than one of each component shown in FIG. 9. For example, in some embodiments, the wagering game machine 906 can include multiple external system interfaces 924 and/or multiple CPUs 926. In some embodiments, any of the components can be integrated or subdivided.

In some embodiments, the wagering game machine 906 includes a gaming social communication module 937. The gaming social communication module 937 can process communications, commands, or other information, where the processing can control interactivity for gaming and social-communication applications.

Furthermore, any component of the wagering game machine 906 can include hardware, firmware, and/or machine-readable media including instructions for performing the operations described herein.

Wagering Game Machine

Figure 10:
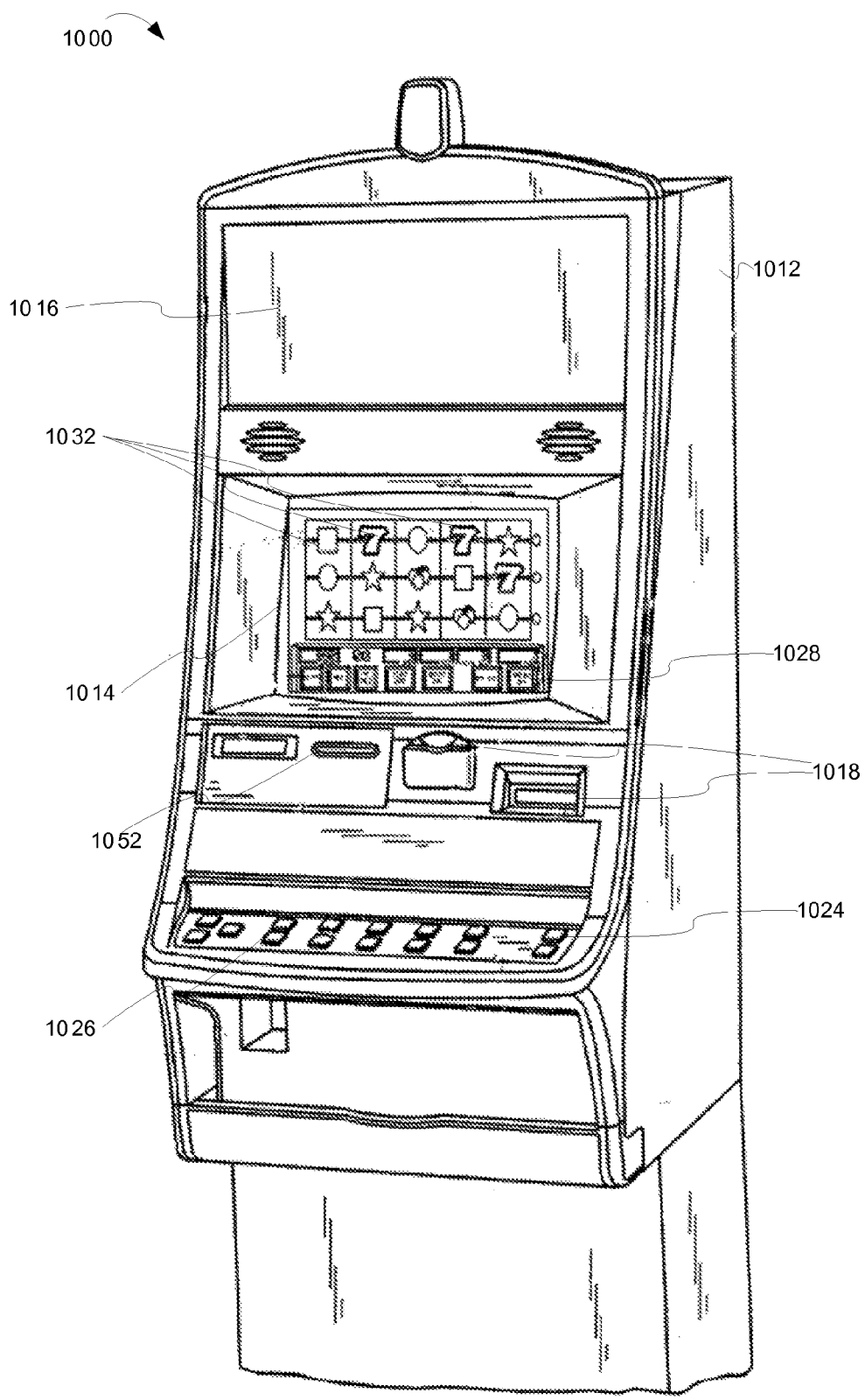
FIG. 10 is an illustration of a wagering game machine 1000, according to some embodiments.

FIG. 10 is a conceptual diagram that illustrates an example of a wagering game machine 1000, according to some embodiments. Referring to FIG. 10, the wagering game machine 1000 can be used in gaming establishments, such as casinos. According to some embodiments, the wagering game machine 1000 can be any type of wagering game machine and can have varying structures and methods of operation. For example, the wagering game machine 1000 can be an electromechanical wagering game machine configured to play mechanical slots, or it can be an electronic wagering game machine configured to play video casino games, such as blackjack, slots, keno, poker, blackjack, roulette, etc.

The wagering game machine 1000 comprises a housing 1012 and includes input devices, including value input devices 1018 and a player input device 1024. For output, the wagering game machine 1000 includes a primary display 1014 for displaying information about a basic wagering game. The primary display 1014 can also display information about a bonus wagering game and a progressive wagering game. The wagering game machine 1000 also includes a secondary display 1016 for displaying wagering game events, wagering game outcomes, and/or signage information. While some components of the wagering game machine 1000 are described herein, numerous other elements can exist and can be used in any number or combination to create varying forms of the wagering game machine 1000.

The value input devices 1018 can take any suitable form and can be located on the front of the housing 1012. The value input devices 1018 can receive currency and/or credits inserted by a player. The value input devices 1018 can include coin acceptors for receiving coin currency and bill acceptors for receiving paper currency. Furthermore, the value input devices 1018 can include ticket readers or barcode scanners for reading information stored on vouchers, cards, or other tangible portable storage devices. The vouchers or cards can authorize access to central accounts, which can transfer money to the wagering game machine 1000.

The player input device 1024 comprises a plurality of push buttons on a button panel 1026 for operating the wagering game machine 1000. In addition, or alternatively, the player input device 1024 can comprise a touch screen 1028 mounted over the primary display 1014 and/or secondary display 1016.

The various components of the wagering game machine 1000 can be connected directly to, or contained within, the housing 1012. Alternatively, some of the wagering game machine's components can be located outside of the housing 1012, while being communicatively coupled with the wagering game machine 1000 using any suitable wired or wireless communication technology.

The operation of the basic wagering game can be displayed to the player on the primary display 1014. The primary display 1014 can also display a bonus game associated with the basic wagering game. The primary display 1014 can include a cathode ray tube (CRT), a high resolution liquid crystal display (LCD), a plasma display, light emitting diodes (LEDs), or any other type of display suitable for use in the wagering game machine 1000. Alternatively, the primary display 1014 can include a number of mechanical reels to display the outcome. In FIG. 10, the wagering game machine 1000 is an "upright" version in which the primary display 1014 is oriented vertically relative to the player. Alternatively, the wagering game machine can be a "slant-top" version in which the primary display 1014 is slanted at about a thirty-degree angle toward the player of the wagering game machine 1000. In yet another embodiment, the wagering game machine 1000 can exhibit any suitable form factor, such as a free standing model, bar top model, mobile handheld model, or workstation console model.

A player begins playing a basic wagering game by making a wager via the value input device 1018. The player can initiate play by using the player input device's buttons or touch screen 1028. The basic game can include arranging a plurality of symbols along a pay line 1032, which indicates one or more outcomes of the basic game. Such outcomes can be randomly selected in response to player input. At least one of the outcomes, which can include any variation or combination of symbols, can trigger a bonus game.

In some embodiments, the wagering game machine 1000 can also include an information reader 1052, which can include a card reader, ticket reader, bar code scanner, RFID transceiver, or computer readable storage medium interface. In some embodiments, the information reader 1052 can be used to award complimentary services, restore game assets, track player habits, etc.

Mobile Wagering Game Machine

Figure 11:
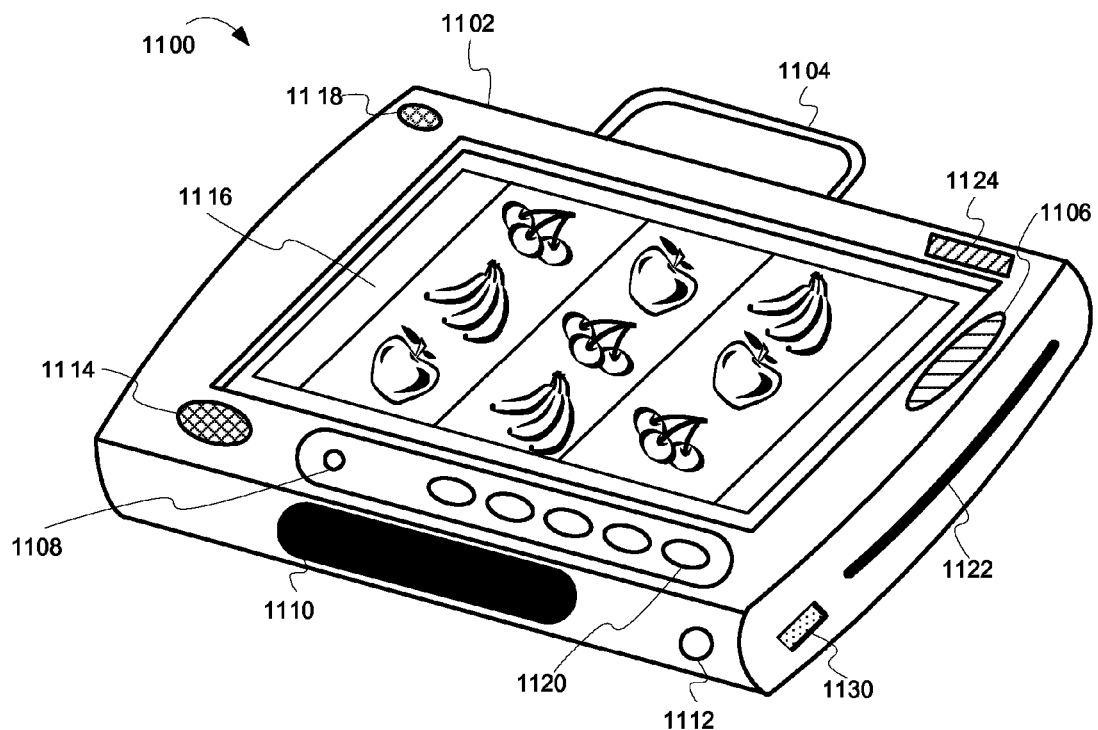
FIG. 11 is an illustration of a mobile wagering game machine 1100, according to some embodiments.

FIG. 11 is a conceptual diagram that illustrates an example of a mobile wagering game machine 1100, according to some embodiments. In FIG. 11, the mobile wagering game machine 1100 includes a housing 1102 for containing internal hardware and/or software such as that described above vis-à-vis FIG. 9. In some embodiments, the housing has a form factor similar to a tablet PC, while other embodiments have different form factors. For example, the mobile wagering game machine 1100 can exhibit smaller form factors, similar to those associated with personal digital assistants. In some embodiments, a handle 1104 is attached to the housing 1102. Additionally, the housing can store a foldout stand 1110, which can hold the mobile wagering game machine 1100 upright or semi-upright on a table or other flat surface.

The mobile wagering game machine 1100 includes several input/output devices. In particular, the mobile wagering game machine 1100 includes buttons 1120, audio jack 1108, speaker 1114, display 1116, biometric device 1106, wireless transmission devices (e.g., wireless communication units 1112 and 1124), microphone 1118, and card reader 1122. Additionally, the mobile wagering game machine can include tilt, orientation, ambient light, or other environmental sensors.

In some embodiments, the mobile wagering game machine 1100 uses the biometric device 1106 for authenticating players, whereas it uses the display 1116 and the speaker 1114 for presenting wagering game results and other information (e.g., credits, progressive jackpots, etc.). The mobile wagering game machine 1100 can also present audio through the audio jack 1108 or through a wireless link such as Bluetooth.

In some embodiments, the wireless communication unit 1112 can include infrared wireless communications technology for receiving wagering game content while docked in a wager gaming station. The wireless communication unit 1124 can include an 802.11G transceiver for connecting to and exchanging information with wireless access points. The wireless communication unit 1124 can include a Bluetooth transceiver for exchanging information with other Bluetooth enabled devices.

In some embodiments, the mobile wagering game machine 1100 is constructed from damage resistant materials, such as polymer plastics. Portions of the mobile wagering game machine 1100 can be constructed from non-porous plastics, which exhibit antimicrobial qualities. Also, the mobile wagering game machine 1100 can be liquid resistant for easy cleaning and sanitization.

In some embodiments, the mobile wagering game machine 1100 can also include an input/output ("I/O") port 1130 for connecting directly to another device, such as to a peripheral device, a secondary mobile machine, etc. Furthermore, any component of the mobile wagering game machine 1100 can include hardware, firmware, and/or machine-readable media including instructions for performing the operations described herein.

The described embodiments may be provided as a computer program product, or software, that may include a machine-readable medium having stored thereon instructions, which may be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. One or more non-transitory, machine-readable storage media having instructions stored thereon, which when executed by a set of one or more processors cause the set of one or more processors to perform operations comprising:
    detecting an occurrence of a wagering game outcome;
        based on the occurrence of the wagering game outcome, providing a persistent object,
    wherein the persistent object is stored in an inventory for a wagering game player account, wherein the inventory is accessible via a social communication application configured to provide social communication functionality, and wherein the persistent object includes metadata instructions to perform a wagering game function if the persistent object is transferred to a portion of the social communication application associated with wagering game functionality;
    in response to user input, transferring the persistent object from the inventory accessible via the social communication application to an area of a display associated with the wagering game functionality, wherein the area of the display is associated with a chat console for the social communication application, wherein a wagering game is presented via a chat message in the chat console, and wherein the transferring the persistent object comprises transferring the persistent object from the inventory to the chat console; and
    performing the wagering game function in response to the transferring of the persistent object to the area of the display.

2. The one or more non-transitory, machine-readable storage media of claim 1, wherein the persistent object is associated with a profile of a social contact that belongs to the wagering game player account associated with a wagering game session, and wherein the operation of performing the wagering game function includes utilizing an attribute.

3. The one or more non-transitory, machine-readable storage media of claim 1, wherein the persistent object represents an amount of money, and wherein the performing of the wagering game function comprising utilizing the amount of money via the performing of the wagering game function.

4. A computer-implemented method comprising:
    detecting an occurrence of a wagering game outcome;
    based on the occurrence of the wagering game outcome, providing a persistent object, wherein the persistent object is stored in an inventory for a wagering game player account, wherein the inventory is accessible via a social communication application configured to provide social communication functionality, and wherein the persistent object includes metadata instructions to perform a wagering game function if the persistent object is transferred to a portion of an application associated with wagering game functionality;
    selecting, in response to a user input associated with a wagering game player account, the persistent object presented in a first portion of the social communication application that displays the inventory, wherein the first portion of the social communication application that displays the inventory is under control of the social communication application;
    transferring, via at least one of one or more processors, a graphical representation of the persistent object from the inventory presented in the first portion of the social communication application to a wagering game presented in a chat console in a second portion of the social communication application in response to the selecting of the persistent object, wherein the second portion of the social communication application is under control of the social communication application, and wherein the second portion of the social communication application is configured to provide the social communication functionality and the wagering game functionality; and
    performing, via at least one of the one or more processors, a wagering game function for the wagering game presented in the chat console in the second portion of the social communication application in response to the transferring of the graphical representation of the persistent object to the second portion of the social communication application.

5. The computer-implemented method of claim 4 further comprising: performing the wagering game function on behalf of a social contact of the wagering game player account, wherein the wagering game player account is associated with a wagering game session conducted via the second portion of the social communication application.

6. The computer-implemented method of claim 4 further comprising:
    generating an additional wagering game outcome in response to the performing the wagering game function; and
    transferring a benefit associated with the additional wagering game outcome to an additional wagering game player account associated with the social contact based on the additional wagering game outcome.

7. The computer-implemented method of claim 4 further comprising:
    selecting, in response to a second user input associated with the wagering game player account, an additional object from wagering game content presented via the second portion of the social communication application;
    detecting, in response to a third user input associated with the wagering game player account, an indication of movement of the additional object from the second portion of the social communication application to the first portion of the social communication application that displays the inventory; and
    in response to the indication of the movement of the additional object from the second portion of the social communication application to the first portion of the social communication application that displays the inventory, transferring the additional object to the inventory of the wagering game player account.

8. The computer-implemented method of claim 7 further comprising performing a social communication function via the social communication application in response to the transferring the additional object from the second portion of the social communication application to the inventory.

9. A system comprising:
    one or more processors; and
    one or more memory units configured to store instructions, which when executed by at least one of the one or more processors, cause the system to perform operations to:
        based on an occurrence of a wagering game event from a plurality of possible wagering game events, store a persistent object in an inventory for a wagering game player account, wherein the inventory is accessible via an application that performs social communication functions, wherein the persistent object includes metadata instructions to perform a plurality of functions, wherein a first of the functions is a wagering game function, wherein a second of the functions is a non-wagering game function, wherein if the persistent object is placed on a first portion of the application the wagering game function is activated, and wherein if the persistent object is placed on a second portion of the application the non-wagering game function is activated, in response to a user input associated with the wagering game player account, select the persistent object from the inventory, transfer the persistent object to a chat console in the first portion of the application, wherein wagering game content for a wagering game is presented in a chat message in the chat console, detect that the persistent object is placed on the chat console in the first portion of the application, and perform the wagering game function via the first portion of the application.

10. The system of claim 9, wherein the one or more memory units are configured to store the instructions, which when executed by the at least one of the one or more processors, cause the system to further perform operations to perform the wagering game function on behalf of a social contact of the wagering game player account.

11. The system of claim 10, wherein the one or more memory units are configured to store the instructions, which when executed by the at least one of the one or more processors, cause the system to further perform operations to:

generate a wagering game outcome after the wagering game function is performed; and transfer a benefit associated with the wagering game outcome to an additional wagering game player account associated with the social contact.

12. The one or more non-transitory, machine-readable storage media of claim 1, wherein the persistent object originates from a wagering game bot, and wherein the wagering game bot is indicated as a social contact via the social communication application.

13. The one or more non-transitory, machine-readable storage media of claim 1, wherein when the persistent object is transferred to the portion of the social communication application associated with the wagering game functionality the metadata of the persistent object instructs the social communication application to one or more of make a wager for the wagering game and perform a game-play function of the wagering game.

14. The one or more non-transitory, machine-readable storage media of claim 1, wherein the wagering game function is utilized in a first wagering game session and wherein the wagering game outcome occurred via a second wagering game session that occurred prior to the first wagering game session.

15. The computer-implemented method of claim 4 further comprising:

analyzing a history of previous use of the persistent object in context of conditions associated with the social communication application, wherein the persistent object is configured to perform a plurality of different wagering game functions which includes the wagering game function; and based on the history, automatically selecting the wagering game function from the plurality of different wagering game functions.

16. The computer-implemented method of claim 4 further comprising:

detecting an indication of a first wagering game event in the wagering game presented via the chat console of the second portion of the social communication application, wherein the wagering game is conducted by a wagering game bot, and wherein the wagering game bot is indicated as a social contact of the wagering game player account via the social communication application; and in response to performance of the wagering game function, generating a second event that counteracts the first wagering game event.

17. The system of claim 9, wherein the persistent object originates from a wagering game bot, and wherein the wagering game bot is indicated as a social contact via the application.

18. The system of claim 9, wherein the wagering game function is one or more of a wagering function and a game-play function.

19. The system of claim 9, wherein the wagering game function is utilized in a first wagering game session and wherein the wagering game event occurred via a second wagering game session that occurred prior to the first wagering game session.

* * * * *